United States Patent
Bennett, III et al.

(10) Patent No.: US 6,459,957 B1
(45) Date of Patent: Oct. 1, 2002

(54) PROGRAMMABLE SMART MEMBRANES AND METHODS THEREFOR

(75) Inventors: Forrest H. Bennett, III, Palo Alto; Eleanor G. Rieffel, Mountain View; Bradley E. Dolin, Stanford, all of CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/835,323

(22) Filed: Apr. 17, 2001

(51) Int. Cl.$^7$ .............................................. G06F 19/00
(52) U.S. Cl. .................. 700/245; 700/86; 700/189; 700/248; 700/249; 700/250; 700/251; 700/262; 714/763; 714/764; 714/766; 714/770; 714/772; 318/560; 318/568.11; 403/169; 403/170; 403/171; 403/174; 403/176
(58) Field of Search ..................... 700/189, 86, 245, 700/248, 249, 250, 251, 262; 714/763, 764, 766, 770, 772; 403/169, 170, 171, 174, 176; 318/568.11, 560; 600/114

(56) References Cited

U.S. PATENT DOCUMENTS

| | | | |
|---|---|---|---|
| 4,935,877 A | 6/1990 | Koza | |
| 5,222,192 A | 6/1993 | Shaefer | |
| 5,655,665 A | 8/1997 | Allen et al. | |
| 5,893,974 A | 4/1999 | Keller et al. | |
| 6,011,372 A | 1/2000 | Popovich, Jr. et al. | |
| 6,233,502 B1 * | 5/2001 | Yim et al. | 700/245 |
| 6,233,503 B1 * | 5/2001 | Yim et al. | 700/245 |
| 6,243,622 B1 * | 6/2001 | Yim et al. | 700/245 |

OTHER PUBLICATIONS

Bennet III et al., Programmable Smart Membrane: Using genetic programming to evolve scalable distributed controllers fort a novel self–recofigurable modular robotic application, 20001, Internet , see entire document.*

Bennet III et al., Programmable Smart Membrane: Using genetic programming to evolve scalable distributed controllers fort a novel self–recofigurable modular robotic application, 20001, Internet , p. 1.*

Kurashige et al., Motion planning based on hierarchical knoledge using genetic programming, 1999, IEEE, pp. 2464–2469.*

Chongstitvatana, Improving robustness of robot programs generated by genetic programming for dynamic environments, 1998 IEEE, pp. 523–526.*

Lewis et al. Genetic programming approach to the construction of a neural network for control of a walking robot, 1992, IEEE, pp. 2618–2623.*

Kiguchi et al., Identification of robot manipulators using neural networks adn genetic programming, 1999, IEEE, pp. 802–806.*

Craig McGray et al., Self–reconfigurable molecule robots as 3D Metamorphic robots, 1998, IEEE, pp. 837–842.*

Bojinov et al., Multiagent control of self–reconfigurable robots, 200, ltnternet/EEE, pp. 1–8.*

Smemi et al., Hormone–controlled metamorphic robots, 2001, Internet/IEEE, pp. 4194–4199.*

(List continued on next page.)

Primary Examiner—William A. Cuchlinski, Jr.
Assistant Examiner—McDieunel Marc
(74) Attorney, Agent, or Firm—Oliff & Berridge, PLC

(57) ABSTRACT

A programmable smart membrane and methods therefor. The smart membrane conducts an overall function on at least one of a sorting function, a filtering function and an absorbing function of at least one object having an attribute. The smart membrane includes a plurality of module units disposed adjacent each other. Each of the plurality of module units obtains information from an environment around each of the plurality of module units. The plurality of module units also each perform a function based on at least a first control method that determines the function based on the information for each of the plurality of module units. Wherein the plurality of module units individually perform function to collectively perform the overall function of the membrane based on the attribute of the object.

36 Claims, 14 Drawing Sheets

OTHER PUBLICATIONS

Mojarrad et al., Biomimetic robotic propulsion using polymeric artificial muscles, 1997, Internet/IEEE, pp. 5152–2157.*

Slsbury, 3D Molecular modeling, 1996, Internet, pp. 1–6.*

Forrest H. Bennett III et al., "Design of Decentralized Controllers for Self–Reconfigurable Modular Robots Using Genetic Programming", NASA DoD Workshop on Evolvable Hardware, Jul. 2000.

Forrest H. Bennett III et al., "Using Genetic Programming to Design Decentralized Controllers for Self–Reconfigurable Modular Robots", GECCO (Genetic and Evolutional Computation Conference), Jul. 2000.

Forrest H. Bennett III et al., "A method for the Automated Design of Decentralized Controllers for Modular Self–Reconfigurable Robots", Filed Jul. 7, 2000.

Eric Bonabeau et al., "Swarm Intelligence: From Natural to Artificial Systems", Oxford University Press, 1999.

Hristo Bojinov et al., "Emergent Structures in Modular Self–reconfigurable Robots", IEEE International Conference on Robotics and Automation (ICRA), vol. 2, pp. 1734–1741, 2000.

Arancha Casal et al., "Self–Reconfiguration Planning for a Class of Modular Robots", Proceedings of SPIE, vol. 3839.

I. M. Chen et al., "Determining Task Optimal Modular Robot Assembly Configurations", IEEE International Conference on Robotics and Automation, Nagoya, Japan, pp. 132–137, 1995.

I. M. Chen, "On Optimal Configuration of Modular Reconfigurable Robots", $4^{th}$ International Conference on Control, Automation, Robotics and Vision, Sinagpore 1996, pp. 1–5.

K. Eric Drexler, "Nanosystems: Molecular, Machinery, Manufacturing, and Computation", John Wiley & Sons, Inc., pp. 372–410, 1992.

Robert A. Freitas Jr., "Respirocytes—A Mechanical Artificial Red Cell: Exploratory Design in Medical Nanotechnology", Research Fellow, Institute for Molecular Manfacturing (IMM), 1996.

Robert A. Freitas Jr., "Shapes and Metamorphic Surfaces", Nanomedicine vol. 1: Basic Capabilities, Landes Bioscience, pp. 123–137, 1999.

Yoshihiro Ito, "Signal–responsive gating by a polyelectrolyte pelage on a nanoporous membrane", Nanotechnology, vol. 9, No. 3, pp. 205–207, Sep. 1998.

Andres Castano et al., "The Conro Project", University of Southern California, Information Sciences Institute, date unknown.

M. Koch et al., "A Micromachined Particle Sorter: Principle and Technology", Tech. Digest, Eurosensors XII, Southampton, UK, Sep. 13–16, vol. 1, pp. 595–599, 1998.

Keith Kotay et al., "The Self–reconfiguring Robotic Molecule: Design and Control Algorithms", Dartmouth College, Hanover, NH, USA, date unknown.

Toribio R. Otero et al., "EAP as Multifunctional and Biomimetic Material", Smart Structures and Materials 1999: Electroactive Polymer Actuators and Devices, vol. 3669, pp. 26–34.

A. Pamecha et al., "Design and Implementation of Metamorphic Robots", Proceedings of 1996 ASME Design Engineering Technical Conference and Computers in Engineering Conforence, pp. 1–10, New York, NY, ASME Press, 1996.

Amit Pamecha et al., "A Useful Metric for Modular Robot Motion Planning", IEEE Transactions on Robots and Automation, vol. 13, No. 4, pp. 531–545, Aug. 1997.

Daniela Rus et al., "Self–reconfiguration Planning with Compressible Unit Modules", Proceedings of the 1999 IEEE International Conference on Robtics and Automation, Detroit, 1999.

Cem Ünsal et al., "A Modular Self–Reconfigurable Bipartite Robotic System: Implementation and Motion Planning", Tech Report, Institute for Complex Engineered Systems, Carnegie Mellon University, 2000.

Cem Ünsal et al., "Motion Planning for Modular Self–Reconfiguring Robotic System", $5^{th}$ International Symposium on Distributed Autonomous Robotic Systems (DARS 2000), Knoxville, TN, USA, 2000.

Mark Yim et al., "Rhombic Dodecahedron Shape for Self-Assembling Robots", Xerox PARC SPLE Tech Report P9710777.

D. Biegelsen et al., "Characterization of Shear Stress Field Induced By Obliquely Impinging Airjets", MEMs, vol. 1, pp. 385–389, 1999.

* cited by examiner

FIG. 10A
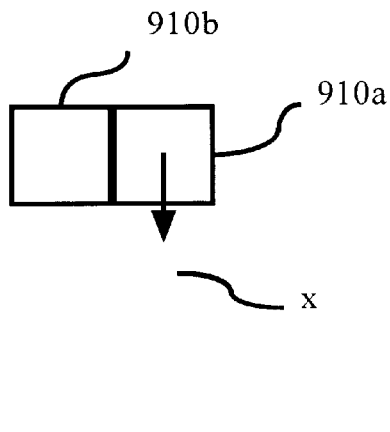
FIG. 10B
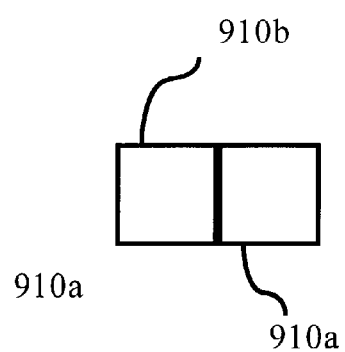
FIG. 10C
FIG. 11A
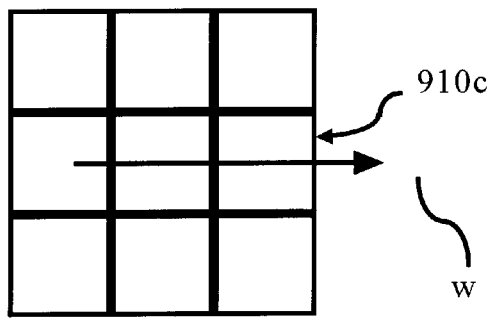
FIG. 11B
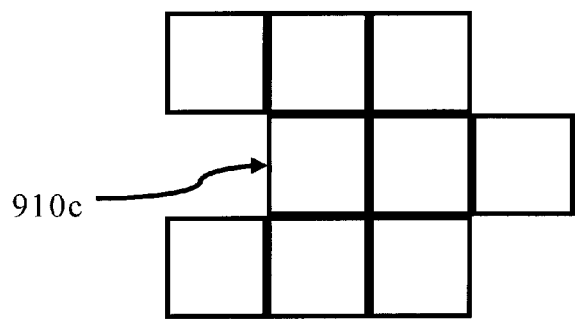

PROGRAMMABLE SMART MEMBRANES AND METHODS THEREFOR

BACKGROUND OF THE INVENTION

1. Field of Invention

This invention is directed to apparatus and methods relating to programmable smart membranes and methods therefor.

2. Description of Related Art

Some related art devices include micromachined sorters. For example, U.S. Pat. No. 5,655,665, discloses a micromachined magnetic particle manipulator and separator for magnetic particles suspended in fluid.

Another micromachined sorter is disclosed in U.S. Pat. No. 5,893,974, wherein a micro scale passive filter is disclosed having sufficiently small holes to permit the passage of small desired biomolecules and at the same time prevent the passage of all larger molecules such as antibodies.

Another related art micromachined sorter includes the passive particle sorter disclosed by M. Koch, C. Schabmueller, A. G. R. Evans, A. Brunnschweiler, "A Micromachined Particle Sorter: Principle and Technology", Tech. Digest, Eurosensors XII, Southampton, UK, Sep. 13–16, 1998.

However, these related art micromachined sorters can only sort particles by predefined features or are static/passive and thus are non-programmable.

Other related art devices include nanometer scale membranes. For example, Yoshihiro Ito, "Signal-responsive Gating by a Polyelectrolyte Pelage on a Nanoporous Membrane", Nanotechnology, pp 205–207, Vol. 9 No. 3, September 1998, discloses a nanometer scale active membrane wherein the rate of water permeation through the membrane is controlled by pH levels and ionic strength.

Another nanometer scale membrane is disclosed in K. Eric Drexler, "Nanosystem: Molecular Machinery, Manufacturing, and Computation, John Wiley & Sons, Inc., 1992. Drexler discloses a design for a unidirectional active molecule sorter capable of transporting specific molecules across a barrier. Drexler mentions the possibility of a version of this design which can change the specificity of the transported molecules by using an elastic deformation of the receptor or altering the local charge distribution around the receptor.

Another related art nanometer scale membrane with poricity controlled by electroactive polymer actuators is described in Toribio F. Otero, Univ. del Pais Vasco, and San Sebastian, "EAP as Multifunctional and Biomimetic Materials", in Smart Structures and Materials 1999: Electroactive Polymer Actuators and Devices, edited by Yoseph Bar-Cohen, pp.26–34, 1999.

However, all of the related art nanometer scale membranes have filtering functions that are preset and which cannot be subsequently altered.

Related art control methods and techniques include the system disclosed in U.S. Pat. No. 6,011,372, which is a unified modular system of drives and controls for mobile robotic applications. However, the robot of this modular system is not modular and the control of the robot is hierarchical.

SUMMARY OF THE INVENTION

The invention provides a programmable smart membrane and methods therefor that overcome the deficiencies and shortfalls of the prior art.

The invention provides a programmable smart membrane that is capable of being programmed so as to reject, transport, or absorb objects depending on features of the objects.

The invention separately provides the control software for a programmable smart membrane.

The invention separately provides a programmable smart membrane that separates two or more regions.

The invention separately provides a programmable smart membrane that separates a region and provides one-way filtering into or out of that region.

The invention separately provides a programmable smart membrane that separates a region and provides two-way filtering into and out of that region by transporting objects in both directions through the membrane.

The invention separately provides a programmable smart membrane that is planar.

The invention separately provides a programmable smart membrane that separates three-dimensional regions.

The invention separately provides a programmable smart membrane that works with a single object at a time.

The invention separately provides a programmable smart membrane that works with multiple objects simultaneously.

The invention separately provides a programmable smart membrane that is programmable and reprogrammable to reject, transport, or absorb objects based on a diverse set of properties of the objects.

The invention separately provides a programmable smart membrane that has diverse applications.

The invention separately provides a programmable smart membrane that sorts parts on a macro scale level.

The invention separately provides a programmable smart membrane that purifies substances and augments biochemical processes on a nanometer scale level.

The invention separately provides control software for a programmable smart membrane that includes both identical and non-identical module units.

The invention separately provides a control software for a programmable smart membrane that is generated by evolutionary techniques.

The invention separately provides decentralized control software for a programmable smart membrane.

The invention separately provides control software for a programmable smart membrane that scales with the number of module units in the membrane and the number of objects to be filtered, both in sequence and simultaneously.

The invention separately provides control software for a programmable smart membrane which is functional under various configurations of its modules and the objects to be filtered.

The invention separately provides a programmable smart membrane that includes a plurality of sliding robotic modules.

The invention separately provides a programmable smart membrane that includes a plurality of rotating robotic modules.

The invention separately provides a programmable smart membrane that includes a plurality of compressible robotic modules.

The invention separately provides a programmable smart membrane that uses control software found using a fitness function.

The invention separately provides a programmable smart membrane that can sort, filter, and/or absorb objects based on at least one following properties of the objects: color; size; shape; temperature; density; weight; stiffness; elasticity; charge; force; reflectivity; magnetic flux; conductivity; frictionality; compressibility; movement of the objects being filtered; communication with the object; the way any of the above attributes change over time; and the way any of the above attributes vary across the object.

The invention separately provides a programmable smart membrane that continues to perform a desired task in the presence of various failures or noise in or inaccuracy of sensors, motors, power, and changing or unknown environmental conditions.

The invention separately provides a programmable smart membrane that continues to perform a desired task in spite of the failure of a motor in one or several of the module units.

The invention separately provides a programmable smart membrane that continues to perform a desired task in spite of the failure of a sensor in one or several of the module units.

The invention separately provides a programmable smart membrane that continues to perform a desired task in spite of power loss in one or several of the module units.

The invention separately provides a programmable smart membrane that continues to perform a desired task in spite of inaccurate sensor readings by sensors in one or several of the module units.

The invention separately provides a programmable smart membrane, including 2D sliding robots, that sorts objects based on color.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein:

FIGS. 10A–10C are schematics displaying a single movement of exemplary robotic modules;

FIGS. 11A–11B are schematics displaying a line movement of exemplary robotic modules;

DETAILED DESCRIPTION OF PREFERRED EMBODIMENTS

The invention is a programmable membrane and methods therefor that overcome the deficiencies and short falls of the related art.

The invention includes a smart membrane that can be programmed to reject, transport, and/or absorb items depending on features or attributes of the items. The smart membrane of the invention includes a plurality of module units. The overall smart membrane is self-reconfigurable in that it can reconfigure without any external aid. Each module unit performs functions based on information about its environment. Each module unit communicates with and moves in relation to its neighboring module units in order to accomplish an overall task for the entire membrane, such as filtering. The function performed by the module units are based on a control program/method.

Figure 1A:
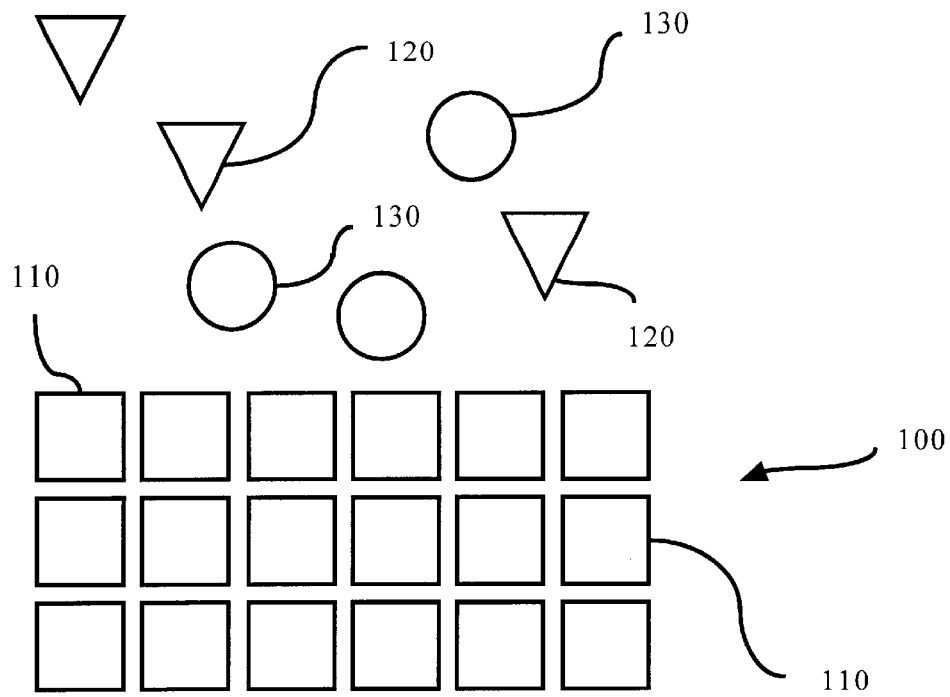
FIGS. 1A–1C are schematics of an exemplary embodiment of a smart membrane according to the invention that filters objects.
Figure 1B:
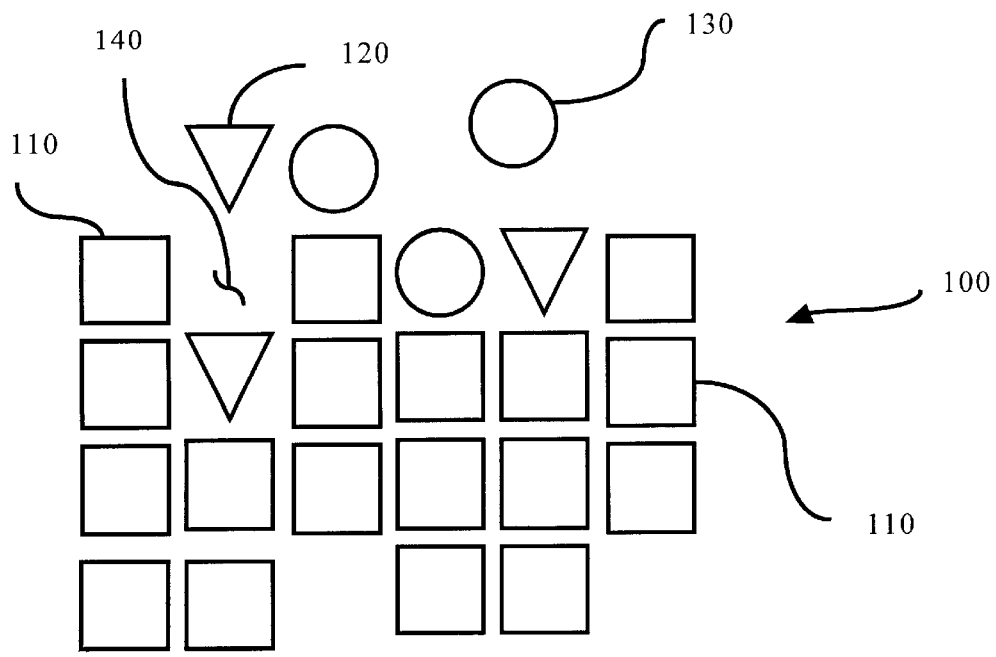
Figure 1C:
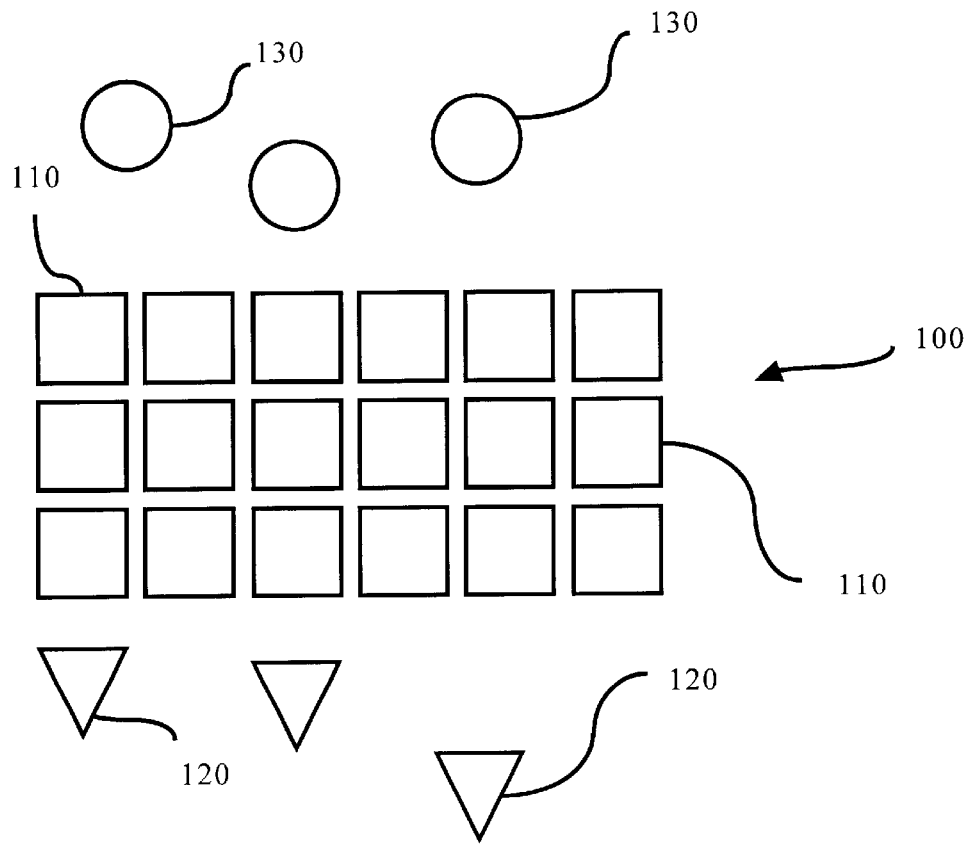

FIGS. 1A–1C display an exemplary embodiment of a smart membrane 100 according to the invention. The smart membrane 100 includes a plurality of module units 110. The smart membrane 100 in this exemplary embodiment is functioning as a one-way filter. It should be appreciated that in other various exemplary embodiments, a smart membrane according to the invention can also function to filter multi-directionally, and sort and capture/absorb objects, as shown in FIGS. 2A–2C, 3A–3C and 4A–4C, respectively.

As shown in FIGS. 1A–1C, the smart membrane 100 filters objects to allow objects with a first attribute 120 to pass the membrane 100 and to stop objects with a second attribute 130 from passing the membrane 100. Objects with the first attribute 120 are displayed as triangles and objects with the second attribute 130 are displayed as circles for discussion purposes only.

FIG. 1A displays an initial stage of the filtering, FIG. 1B displays an intermediate stage of the filtering and FIG. 1C displays a final stage of the filtering. As shown in FIG. 1B, temporary transport channels 140 are created by actions of the module units 110. The temporary channels 140 allow the objects 120 and 130 to pass through the membrane 100.

In this exemplary embodiment, the module units 110 are identical. However, it should be appreciated that in other various exemplary embodiments, the module units 110 are not all identical.

In this exemplary embodiment, the module units 110 operate based on identical sets of instructions or methods. However, it should be understood that in other various exemplary embodiments, less than all of the module units 110 operate based on the identical method.

Each of the module units 110 obtain information about the environment around the module unit. In various exemplary embodiments, the information is local information. The local information is information about the immediate environment around a module unit. In other various exemplary embodiments, the information is global information from all of the module units, i.e. the membrane's environment.

The method of obtaining the information can vary based on each application of the membrane. For example, in various exemplary embodiments, the information is obtained by a physical touching between the module and the environment, which may include neighboring module units. In other various exemplary embodiments, the information is obtained by an electrical connection between a module unit and the environment, which may include neighboring module units.

In various exemplary embodiments, the information is obtained by sensors. The sensors may be any known or later developed sensors or sensing devices and/or methods. In various exemplary embodiments, the sensors are disposed on and/or in the module units. In various exemplary embodiments, the sensors are for detecting the objects 120 and 130 and/or the bounds of the environment for the membrane 100. In various exemplary embodiments, the sensors are infrared sensors.

In other various exemplary embodiments, the information is obtained by a module unit communicating with the environment. For example, in various exemplary embodiments, the module units communicate with one another. In various exemplary embodiments, the module units only communicate with immediately adjacent module units. In other exemplary embodiments, the module units communicate with the objects 120 and 130 and/or the bounds of the environment. Any known or later developed methods and/or devices for communication may be used. In various exemplary embodiments, the communication is conducted by wireless communication.

It should be appreciated that in various exemplary embodiments, the module units may include only sensors, communication devices or both. It should also be appreciated that the sensors and the communication devices may be combined into a single device. Further, it should be appreciated that in various exemplary embodiments, the information obtained via devices for sensing and communicating may include such properties of the objects as, but not limited to: color; size; shape; temperature; density; weight; stiffness; elasticity; charge; force; reflectivity; magnetic flux; conductivity; frictionality; compressibility; movement; communication with the objects; the way any of the above attributes change over time; and the way any of the above attributes vary across the object.

The information obtained by the module units is processed based on the control method that the module units 110 are to follow for their respective functions.

The processing of the information results in function instructions for the respective module unit 110. The function instructions are instructions for the module unit 110 to perform a particular function or functions. The function instructions also include a non-function instruction, which instructs a module unit 110 not to perform any function. In this exemplary embodiment, the function instructions are movement, communication, and internal state change instructions. However, it should be appreciated that the function instructions could include a variety of actions/functions. For example, in various exemplary embodiments, the functions include, but are not limited to: to communicate with the environment, to connect with another module unit, to not move, and/or to change an internal state of the module unit.

In other various exemplary embodiments, the function instructions are effector instructions for the respective module unit 110. For example, a module unit having a faceplate for latching may attach to or detach from a neighboring module unit, for example by latching or unlatching its faceplate to the faceplate of an adjacent module unit.

In various exemplary embodiments, the function instructions are communication instructions for the respective module unit 110. For example, module units may send and receive messages to other module units. These messages can include the sharing of any type of information, requests for information, etc.

In other various exemplary embodiments, the function instructions are instructions for changing the internal state of a module unit, including but not limited to changing the contents of an internal memory for the respective module unit 110, such as, storing the results of calculations, sensor readings, or planned actions for future reference.

In various exemplary embodiments, wherein the functions are movements of the module units, the movement of each module unit is limited to a set of predefined limitations. For example, the module units may have physical structures that limit the movement of the module units 110. In other exemplary embodiments, the movement limitations may be set in an attempt to keep the module units together as a group. An example of a specific movement limitation is that a module unit can only move when it is adjacent to at least one other module unit.

With each of the module units 110 acting independently, based only on their respective environmental information, the membrane as a whole behaves as desired.

The method that the individual module units 110 are following will determine how the module units 110 behave collectively. The control method in various exemplary embodiments is a computer program. In various exemplary embodiments, the computer program is developed using genetic programming techniques, such as but not limited to, the automatic control program generation techniques disclosed in copending U.S. patent application Ser. No. 09/611, 395, filed Jul. 7, 2000, which is incorporated herein by reference in its entirety.

It should also be appreciated that the first and second attributes of objects 120 and 130 may be any type of attribute that can be acquired or learned by the module units 110 through their information obtaining methods and devices. It should also be appreciated that each object may have multiple attributes and that an attribute can change over time and across the actual object. In various exemplary embodiments, the attributes are, but are not limited to, any of the following: color; size; shape; temperature; density; weight; stiffness; elasticity; charge; force; reflectivity; magnetic flux; conductivity; frictionality; compressibility; movement of the objects; communication with the object; the way any of the above attributes change over time; and the way any of the above attributes vary across the object.

In various exemplary embodiments, the membrane 100 includes a mechanism, not shown, for activating and deactivating the membrane 100. The activation mechanism is an "on/off" switch for the membrane 100. In various exemplary embodiments, the mechanism is activated through known or later developed wireless communication methods and devices. In other various exemplary embodiments, the activation mechanism is disposed on the membrane 100 or the module units 110 so that a user can manually activate the mechanism. In other various exemplary embodiments, the activation mechanism includes a plurality of devices that activate individual module units 110.

Figure 2A:
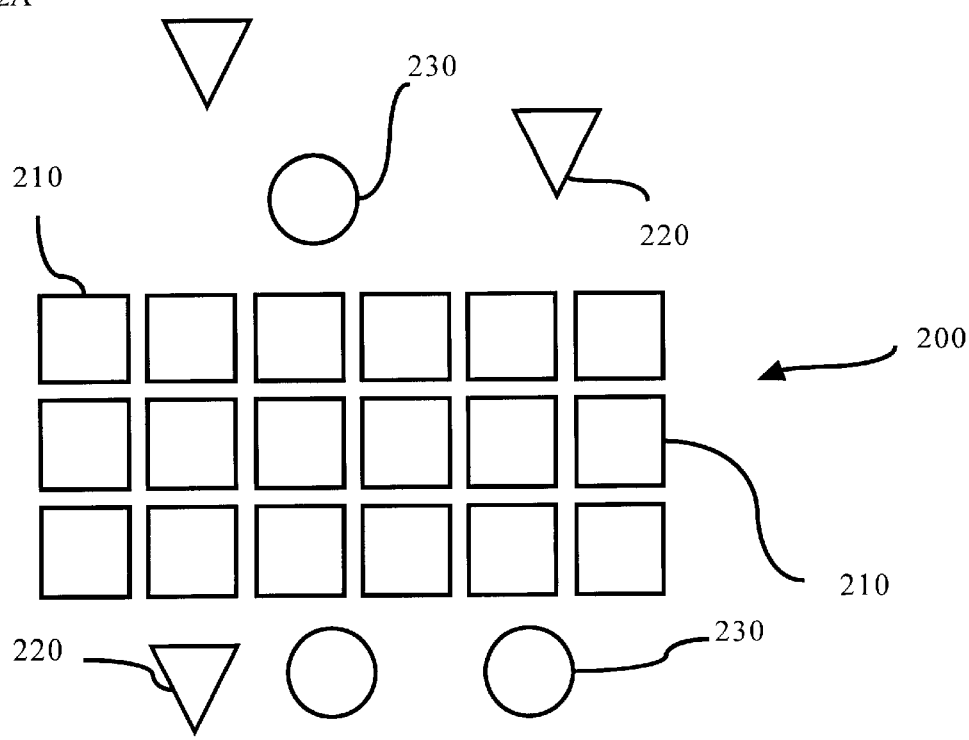
FIGS. 2A–2C are schematics of another exemplary embodiment of a smart membrane according to the invention that filters objects bi-directionally.
Figure 2B:
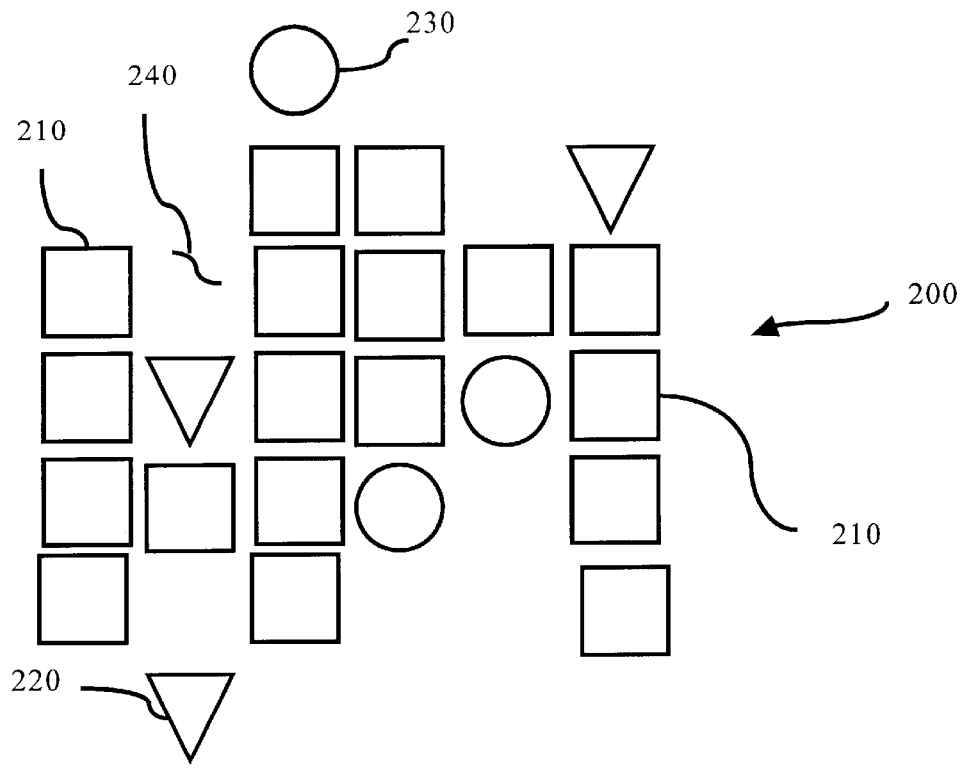
Figure 2C:
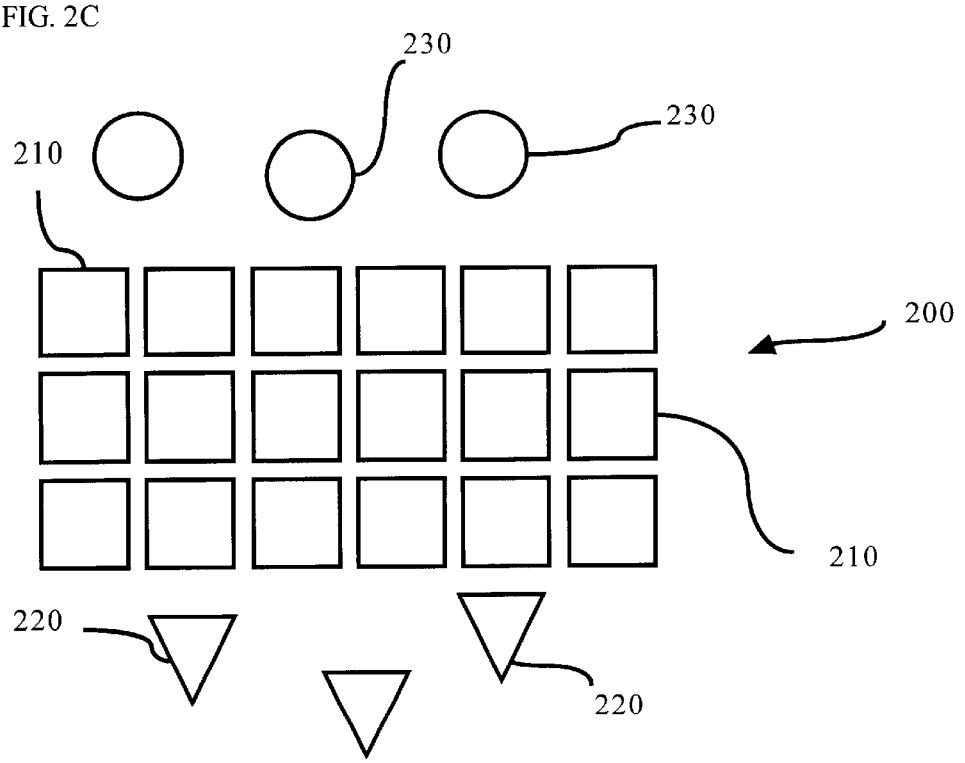

FIGS. 2A–2C display an exemplary embodiment of a smart membrane 200 according to the invention. The smart membrane 200 includes a plurality of module units 210. The smart membrane 200 in this exemplary embodiment is functioning as a bi-directional filter for objects 220 and 230. It should be appreciated that the membrane 200 is identical to the membrane 100 except that the membrane 200 is functioning as a bi-directional filter. In other words, the objects 220 and 230 approach the membrane 200 from two directions and the membrane 200 filters the objects 220 and 230 based on attributes of the objects, such that the objects 220 are filtered to be below the membrane 200 and the objects 230 are filtered to be above the membrane. It should also be appreciated that the objects 220 and 230 are identical to the objects 120 and 130. FIG. 2A displays an initial stage of the filtering, FIG. 2B displays an intermediate stage of the filtering and FIG. 2C displays a final stage of the filtering. As shown in FIG. 2B, temporary transport channels 240 are created by the functions/actions of the module units 210. The temporary channels 240 allow the objects 220 and 230 to pass through the membrane 200.

Figure 3A:
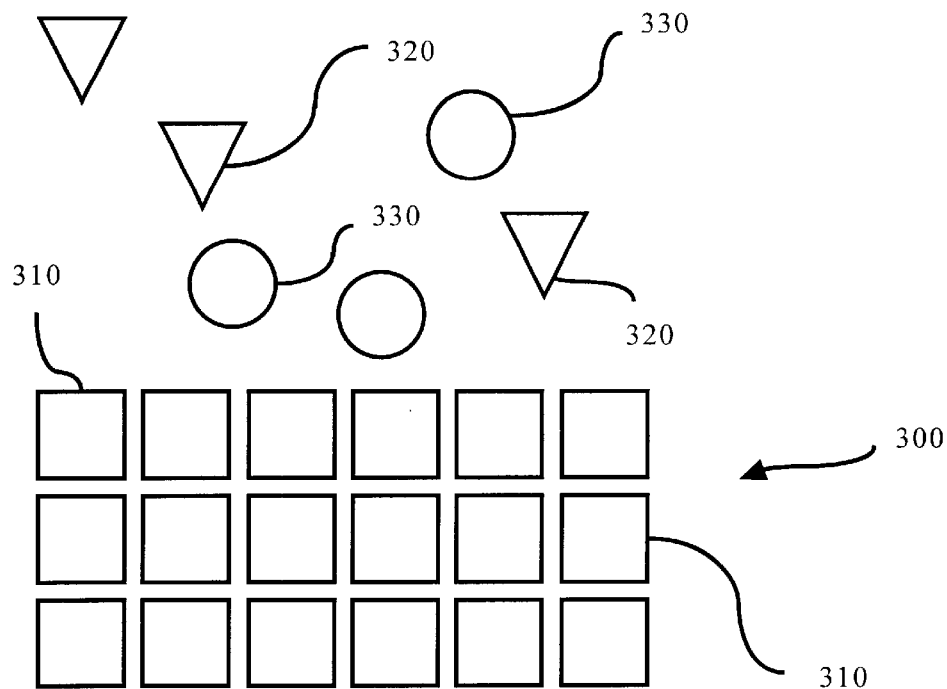
FIGS. 3A–3C are schematics of another exemplary embodiment of a smart membrane according to the invention that sorts objects.
Figure 3B:
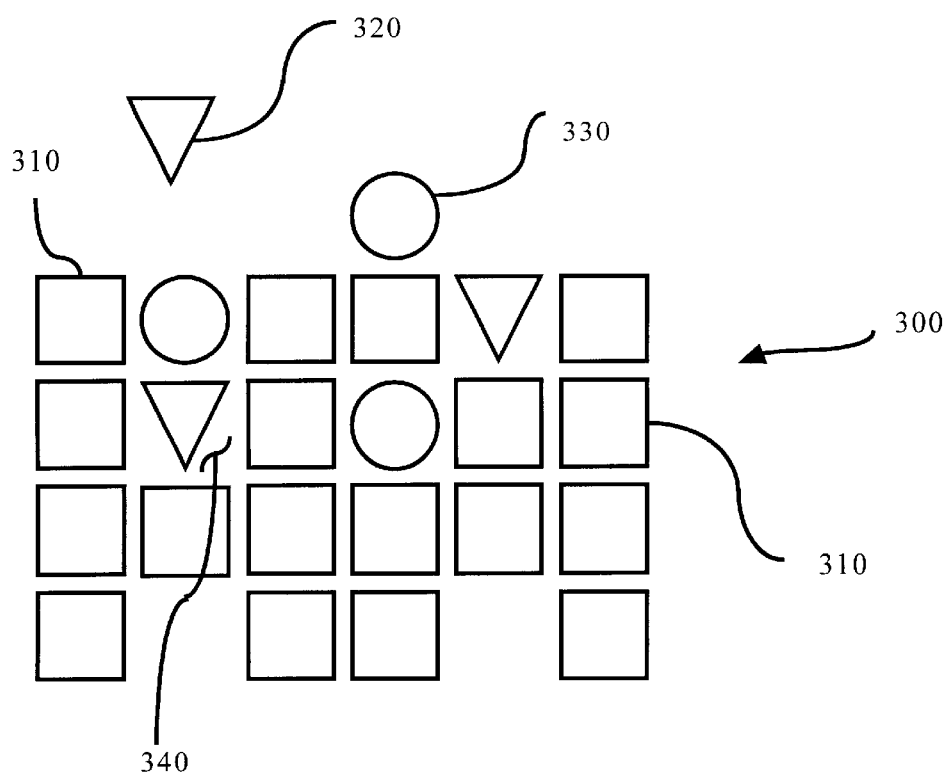
Figure 3C:
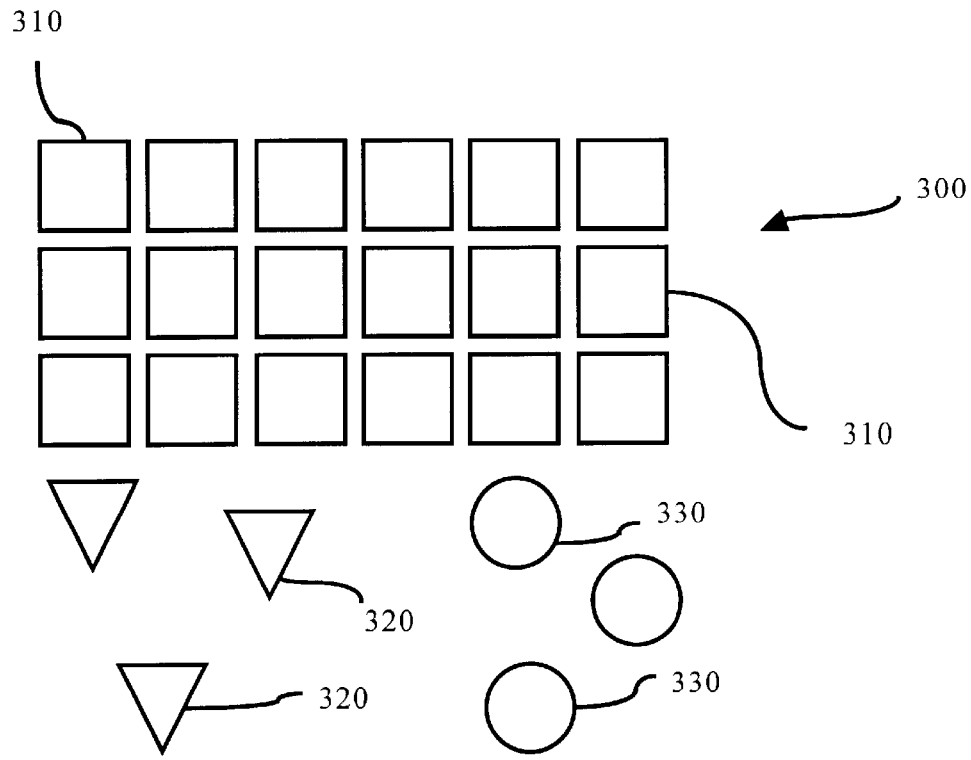

FIGS. 3A–3C display an exemplary embodiment of a smart membrane 300 according to the invention. The smart membrane 300 includes a plurality of module units 310. The smart membrane 300 in this exemplary embodiment is functioning as a sorter for objects 320 and 330. It should be appreciated that the membrane 300 is identical to the membrane 100 except that the membrane 300 is functioning as a sorter. In this exemplary embodiment, the objects 320 and 330 approach the membrane 300 from one direction (the top of the membrane 300) and the membrane 300 sorts the objects 320 and 330 based on attributes of the objects, such that the objects 320 are sorted to be one first side of a region below the membrane 300 and the objects 330 are sorted to be a second side of the region below the membrane. It should also be appreciated that the objects 320 and 330 are identical to the objects 120 and 130. FIG. 3A displays an initial stage of the sorting, FIG. 3B displays an intermediate stage of the sorting and FIG. 3C displays a final stage of the sorting. As shown in FIG. 3B, temporary transport channels 340 are created by the functions/actions of the module units 310. The temporary channels 340 allow the objects 320 and 330 to pass through the membrane 300.

Figure 4A:
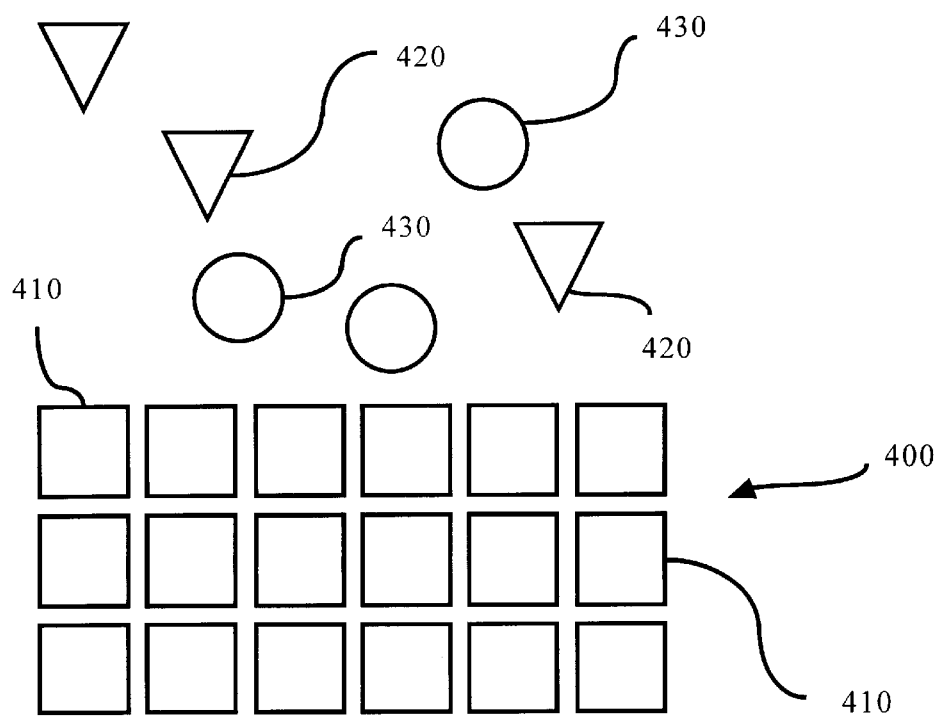
FIGS. 4A–4C are schematics of another exemplary embodiment of a smart membrane according to the invention that absorbs objects.
Figure 4B:
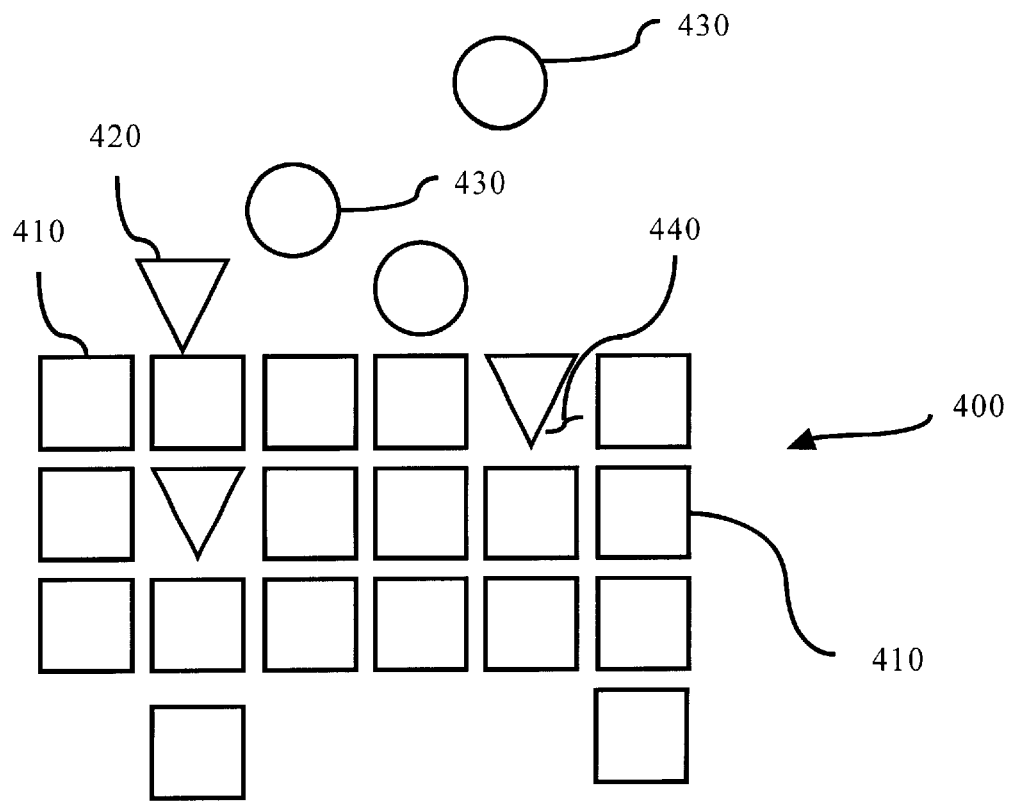
Figure 4C:
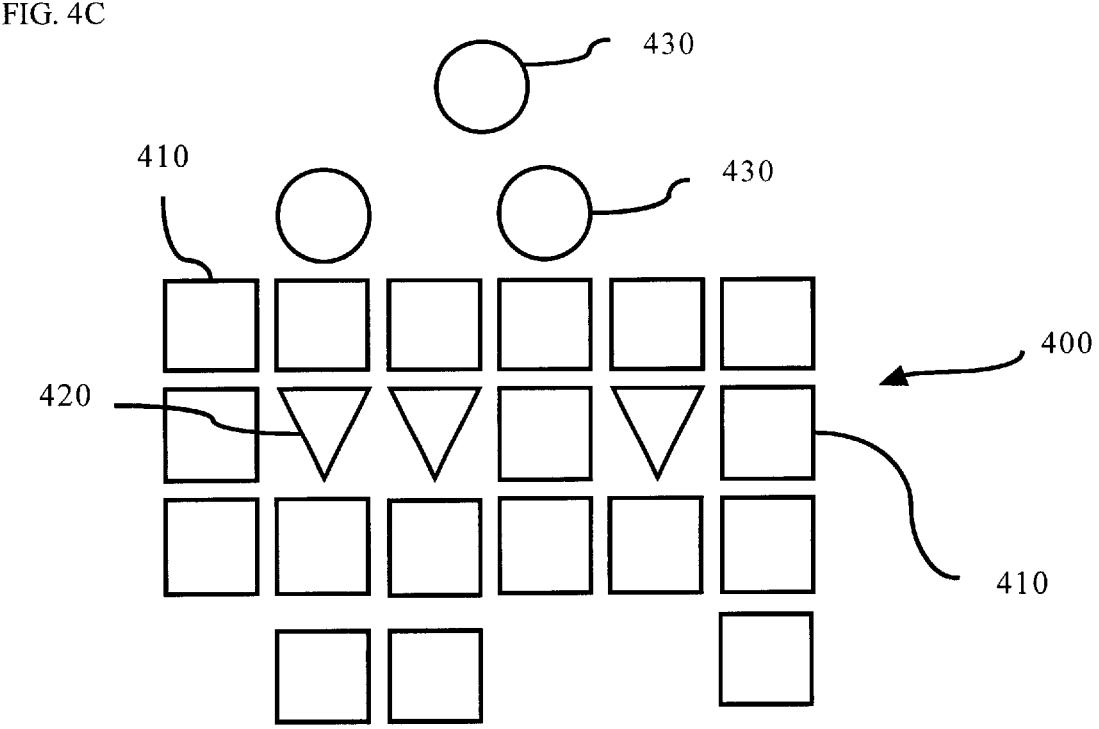

FIGS. 4A–4C display an exemplary embodiment of a smart membrane 400 according to the invention. The smart membrane 400 includes a plurality of module units 410. The smart membrane 400 in this exemplary embodiment is functioning as an absorber for absorbing either objects 420 or 430 based on one or more attributes of the objects. It should be appreciated that the membrane 400 is identical to the membrane 100 except that the membrane 400 is functioning as an absorber. In this exemplary embodiment, the objects 420 and 430 approach the membrane 400 from above the membrane 400. The membrane 400 absorbs only the objects having a predetermined attribute or attributes. In this embodiment, the objects 420 have the appropriate predetermined attribute, whereas the objects 430 do not. The membrane 400 absorbs the objects 420 and keeps the objects 430 out of the membrane based on the attributes of the respective objects. It should also be appreciated that the objects 420 and 430 are identical to the objects 120 and 130. FIG. 4A displays an initial stage of the absorbing, FIG. 4B displays an intermediate stage of the absorbing and FIG. 4C displays a final stage of the absorbing. As shown in FIG. 4B, temporary transport channels 440 are created by the functions/actions of the module units 410. The temporary channels 440 allow the objects 420 and 430 to pass into the membrane 400.

Figure 5:
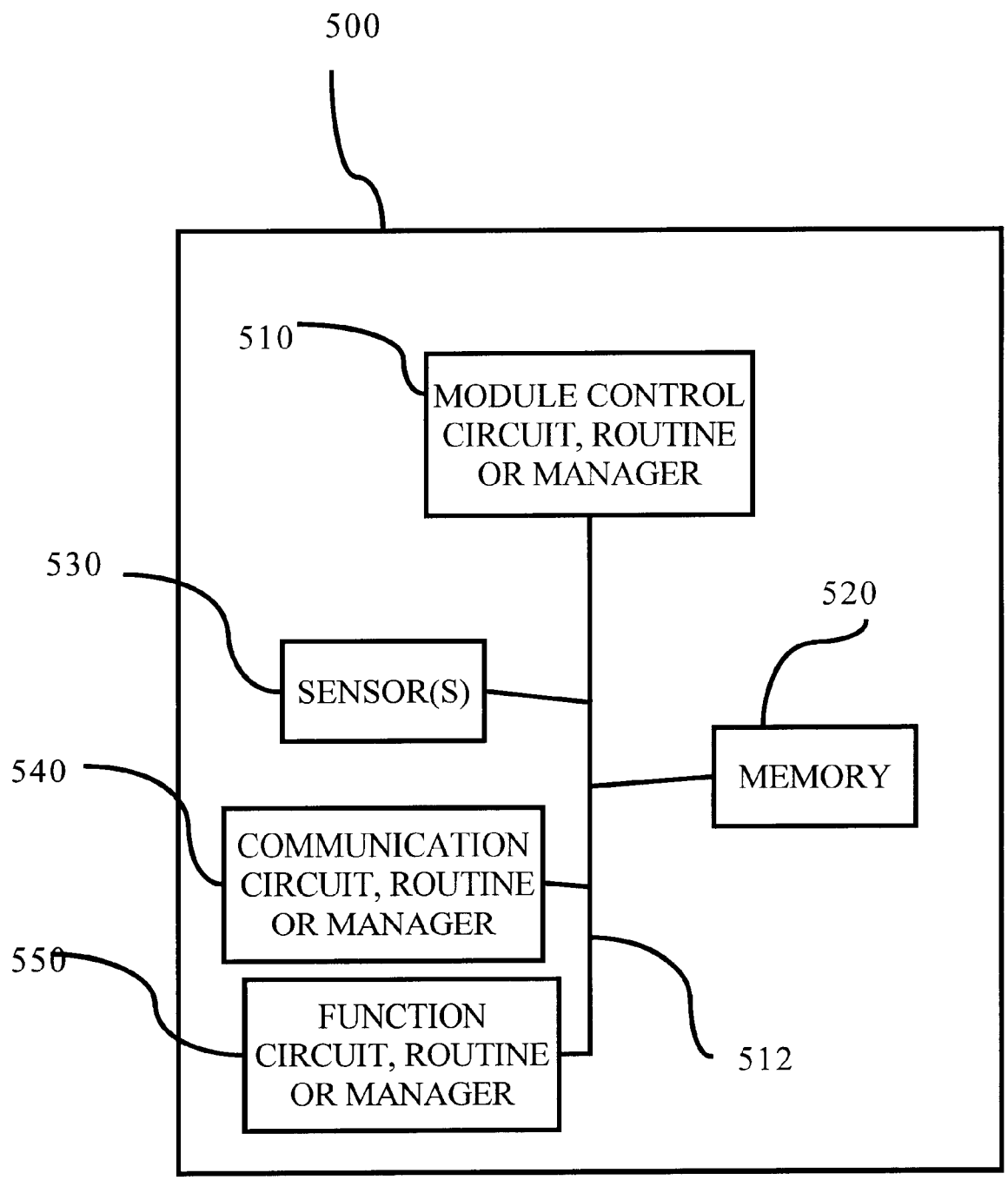
FIG. 5 is a block diagram of one exemplary embodiment of a module unit of an exemplary smart membrane according to the invention, wherein a module control circuit is disposed within the module unit.

FIG. 5 is a block diagram of an exemplary embodiment of a module unit 500 for an exemplary smart membrane according to the invention. The module unit 500 includes a module control circuit, routine or manager 510, a memory 520, a sensor 530, a communication circuit 540 and a function circuit, routine or manager 550, each connected to a signal/data bus 512.

The sensor 530 includes at least one sensor for obtaining information about the environment around the module unit 500, as discussed above. The information obtained by the sensor 530 is provided to the module control circuit, routine or manager 510. In various other exemplary embodiments, the sensed information is stored in the memory 520, such that the sensed information can be subsequently recalled for evaluation or the like.

The communication circuit, routine or manager 540, controls the communication of the module unit 500 to obtain information about the environment around the module unit 500, as discussed above. The communication circuit, routine or manager 540, in various exemplary embodiments, includes obtaining a new method for the module control circuit, routine or manager 510 to use for controlling the module unit. The information obtained by the communication circuit, routine or manager 540, is provided to the module control circuit, routine or manager 510. In various other exemplary embodiments, the communication information is stored in the memory 520, such that the communication information can be subsequently recalled for evaluation or the like.

It should be appreciated that the communication circuit 540 and the sensor 530 can be elements integrated into a single device.

The module control circuit, routine or manager 510 includes the method for controlling the functions of the module unit 500. The module control circuit, routine or manager 510 executes the control method and generates function instructions based on the information obtained by the sensor 530 and the communication circuit, routine or manger 540. In this exemplary embodiment, the information obtained by the sensor 530 and the communication circuit, routine or manager 540, is information that is local to the module unit 500. The function instructions are provided to the function circuit, routine or manager 550. In various other exemplary embodiments, the function instructions are stored in the memory 520, such that the function instructions can be subsequently recalled for evaluation or the like.

The function circuit, routine or manager 550, performs functions based on the function instructions from the module control circuit, routine or manager 510. In various exemplary embodiments, the function circuit, routine or manager 550 controls movement motors disposed on and/or in the module unit 500 based on the function instructions.

As shown in FIG. 5, the memory 520 can be implemented using any appropriate combination of alterable, volatile, or non-volatile memory or non-alterable, or fixed memory. The alterable memory, whether volatile, or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The memory 520 can store any information obtained by the sensor 530 or the communication circuit, routine or manager 540, any information generated by the function circuit, routine or manager 550 or the function instruction from the module control circuit routine or manager 510.

Further, it should be appreciated that the data bus 512 connecting the memory 520 to the module control unit 510 can be a wired or wireless link to a network (not shown). The network can be a local area network, and intranet, or any other distributed processing and storage network.

It should also be understood that each of the circuits, routines or managers shown in FIG. 5 can be implemented as portions of a suitably programmed general purpose computer. Alternatively, each of the circuits, routines or managers shown in FIG. 5 can be implemented as physically distinct hardware circuits, routines or managers within an ASIC, or using a FPGA, a PDL, a PLA or a PAL, or using discrete logic elements or discrete circuit, routine or manager elements. The particular form of each of the circuits, routines or managers shown in FIG. 5 is a design choice.

Figure 6:
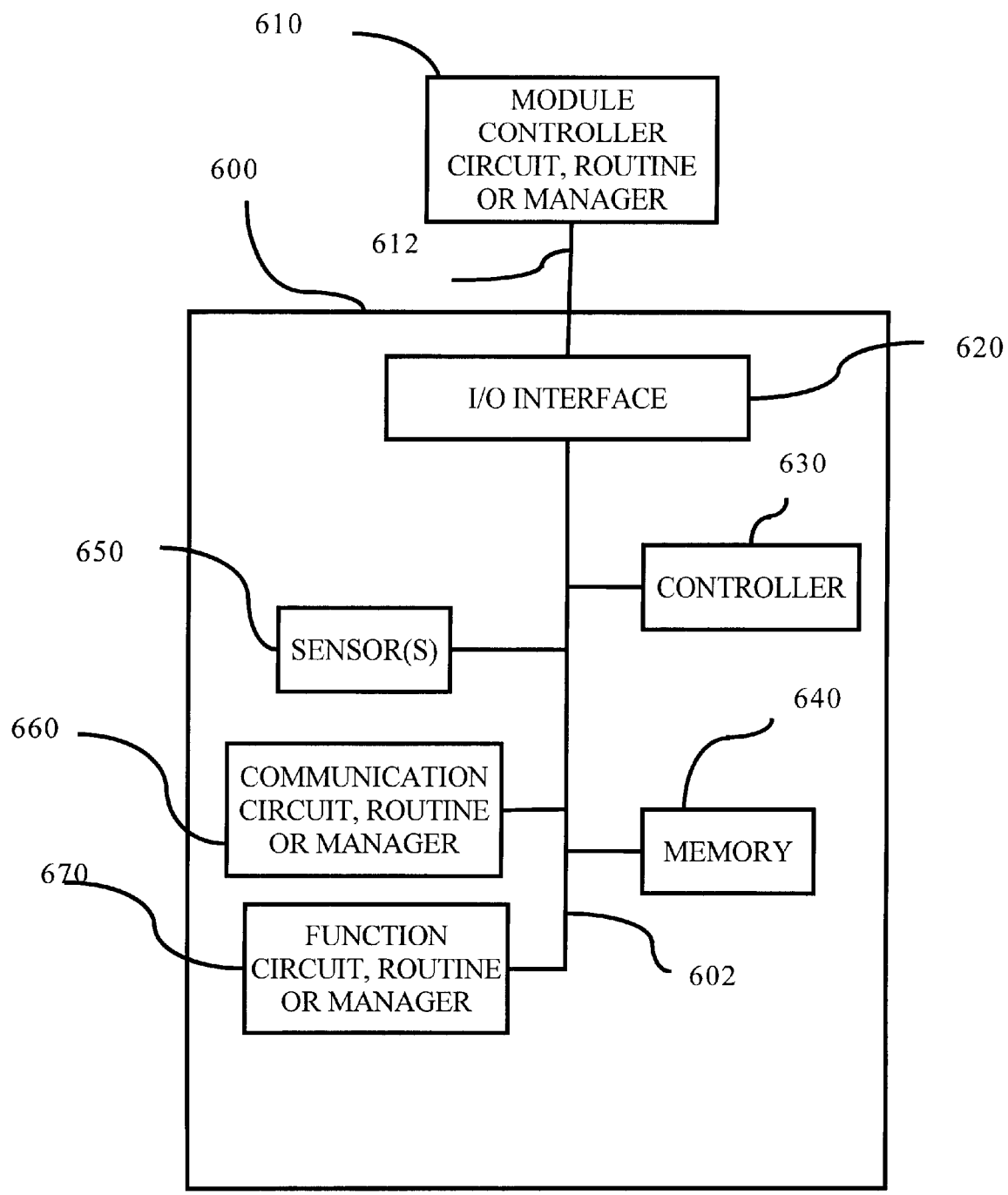
FIG. 6 is a block diagram of another exemplary embodiment of a module unit of an exemplary smart membrane according to the invention, wherein a module control circuit is not disposed within the module unit.

FIG. 6 is a block diagram of an exemplary embodiment of a module unit 600 for an exemplary smart membrane according to the invention. The module unit 600 includes an I/O interface 620, a modular unit controller 630, a memory 640, a sensor 650, a communication circuit 660 and a function circuit, routine or manager 670, each connected to a signal/data bus 612. The I/O interface 620 is connected to a module controller circuit, routine or manager 610 by a link 612.

The link 612 can be any known or later developed device or system that can connect the module controller circuit, routine or manager 610 to the module unit 600, including a direct cable connection, a connection over a wide area network or a local area network, a connection over an intranet, a connection over the Internet, or a connection over any other distributed processing network or system. In general, the link 612 can be any known or later developed connection system or structure.

The sensor 650 includes at least one sensor for obtaining information about the environment around the module unit 600, as discussed above. The information obtained by the sensor 650 is provided to the module controller circuit, routine or manager 610 via the I/O interface 620, under the control of the modular unit controller 630. In various other exemplary embodiments, the sensed information is stored in the memory 640, under the control of the modular unit controller 630 such that the sensed information can be subsequently recalled for evaluation or the like.

The communication circuit, routine or manager 660, controls the communication of the module unit 600 to obtain information about the environment around the module unit 600, as discussed above. The information obtained by the communication circuit, routine or manager 660 is provided to the module controller circuit, routine or manager via the I/O interface 620 under the control of the modular unit controller 630. In various other exemplary embodiments, the communication information is stored in the memory 640 under the control of the controller, such that the communication information can be subsequently recalled for evaluation or the like.

It should be appreciated that the communication circuit, routine or manager 660 and the sensor 650 can be elements integrated into a single device.

The module controller circuit, routine or manager 610 includes the method for controlling the functions of the module unit 600. The module controller circuit, routine or manager 610 is disposed outside the module unit 600. In various exemplary embodiments, the module controller circuit, routine or manager 610 is remotely located from the module unit 600. In various exemplary embodiments, the module controller circuit, routine or manager 610 executes the control method and generates function instructions based on the information obtained by the sensor 650 and the communication circuit, routine or manger 660 and thus provides a decentralized control of the module unit 600. In other various exemplary embodiments, the module controller circuit, routine or manager 610 executes the control method and generates function instructions based on the information obtained by the sensor 650 and the communication circuit, routine or manger 660 as well as information obtained by other module units, and thus provides a centralized control of the module unit 600. The function instructions are provided to the function circuit, routine or manager 670 via the I/O interface 620. In various other exemplary embodiments, the function instructions are stored in the memory 640 via the I/O interface, such that the function instructions can be subsequently recalled for evaluation or the like.

The function circuit, routine or manager 670, performs functions based on the function instructions from the module controller circuit, routine or manager 610. In various exemplary embodiments, the function circuit, routine or manager 670 controls movement motors disposed on and/or in the module unit 600 based on the function instructions.

As shown in FIG. 6, the memory 640 can be implemented using any appropriate combination of alterable, volatile, or non-volatile memory or non-alterable, or fixed memory. The alterable memory, whether volatile, or non-volatile, can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The memory 640 can store any information obtained by the sensor 650 or the communication circuit, routine or manager 660, information generated by the function circuit, routine or manager 670 or the function instructions from module controller circuit, routine or manager 610.

Further, it should be appreciated that the data bus 602 connecting the memory 640 to the modular unit controller 630 can be a wired or wireless link to a network (not shown). The network can be a local area network, and intranet, or any other distributed processing and storage network.

It should also be understood that each of the circuits, routines or managers shown in FIG. 6, can be implemented as portions of a suitably programmed general purpose computer. Alternatively, each of the circuits, routines or managers shown in FIG. 6 can be implemented as physically distinct hardware circuits, routines or managers within an ASIC, or using a FPGA, a PDL, a PLA or a PAL, or using discrete logic elements or discrete circuit, routine or manager elements. The particular form of each of the circuits, routines or managers shown in FIG. 6 is a design choice.

The following description is for an exemplary embodiment of a smart membrane of the invention. It should be appreciated that the smart membrane of the invention may take on various embodiments and should not be limited to the following exemplary embodiments. Various exemplary embodiments of a smart membrane of the invention include making the membrane a modular robot.

A modular robotic smart membrane, according to the invention, is a self-reconfigurable modular robotic device capable of active filtering, sorting, absorbing, or the like, of objects based on a diverse set of properties or attributes, such as but not limited to color, size, or shape, or any other attribute that may be sensed or measured. A modular robotic smart membrane, of the invention, includes a plurality of robot modules or modular hardware.

Modular hardware that can reconfigure itself is usually referred to as a self-reconfigurable modular robot. A self-reconfigurable modular robot is a robot that is composed of many modules, where each module has its own power, motors, computation, memory, and sensors. The modules have motors and catches that enable them to attach to and detach from each other in order to move and perform tasks or functions. Individual modules on their own can do little, but the robot, using just the capabilities of the individual modules, can reconfigure itself to perform different tasks as needed. In various exemplary embodiments, the robot modules are identical components.

In various exemplary embodiments, it is preferred that modular robot control software, which controls the modular robot, be completely decentralized and completely autonomous, so that the tasks can be performed without reference to a central controller, whether human or machine. In various exemplary embodiments, the modular robot control software, according to the invention, is created using genetic programming. The incorporated U.S. patent application Ser. No. 09/611,395, filed Jul. 7, 2000, discloses exemplary methods of using genetic programming for creating the control software. However, it should be appreciated that the control software can be created by a number of different techniques and it may also be predetermined or provided.

A smart membrane can be implemented using any of the self-reconfigurable modular robots, including the types of self-reconfigurable modular robots listed below.

One type of self-reconfigurable modular robot is the compressible modular robots, such as the Crystalline Robots developed at Dartmouth, which consist of cubical modules that can slide past each other. Movement of these robots is possible only through motors that contact the cubes by a factor of two in one or another direction. Both 2D and 3D versions are possible.

Another type of self-reconfigurable modular robot includes rotating modular robots, like Xerox PARC's Proteo robot, in which the modules rotate with respect to each other through hinges at the vertices (2D) or edges (3D) of the modules. The individual modules can be different shapes, like squares or hexagons in 2D, or cubes or rhombic dodecahedrons, as were used in Proteo, in 3D.

Another type of self-reconfigurable modular robot includes prismatic joint modular robots, like Xerox PARC's Polybot, whose modules are cubes which can contract into wedges, as well as attach and detach from each other. The configurations of the modules consist of long strings, occasionally attached to others, forming snake-, spider-, and tank-tread-shaped robots for instance.

One type of self-reconfigurable modular robot includes rotating joint modular robots, like USC's ISI's Spider Link robots, which can rotate with respect to each other. Again, the configurations of the modules consist of long strings, occasionally attached to others.

Another type of self-reconfigurable modular robot includes bi-unit modular robots, like CMU's I-cubes and Dartmouth's Molecule Robots, which consist of two types of modules, cubes and links, which can attach to, detach from, and rotate with respect to each other.

Figure 7:
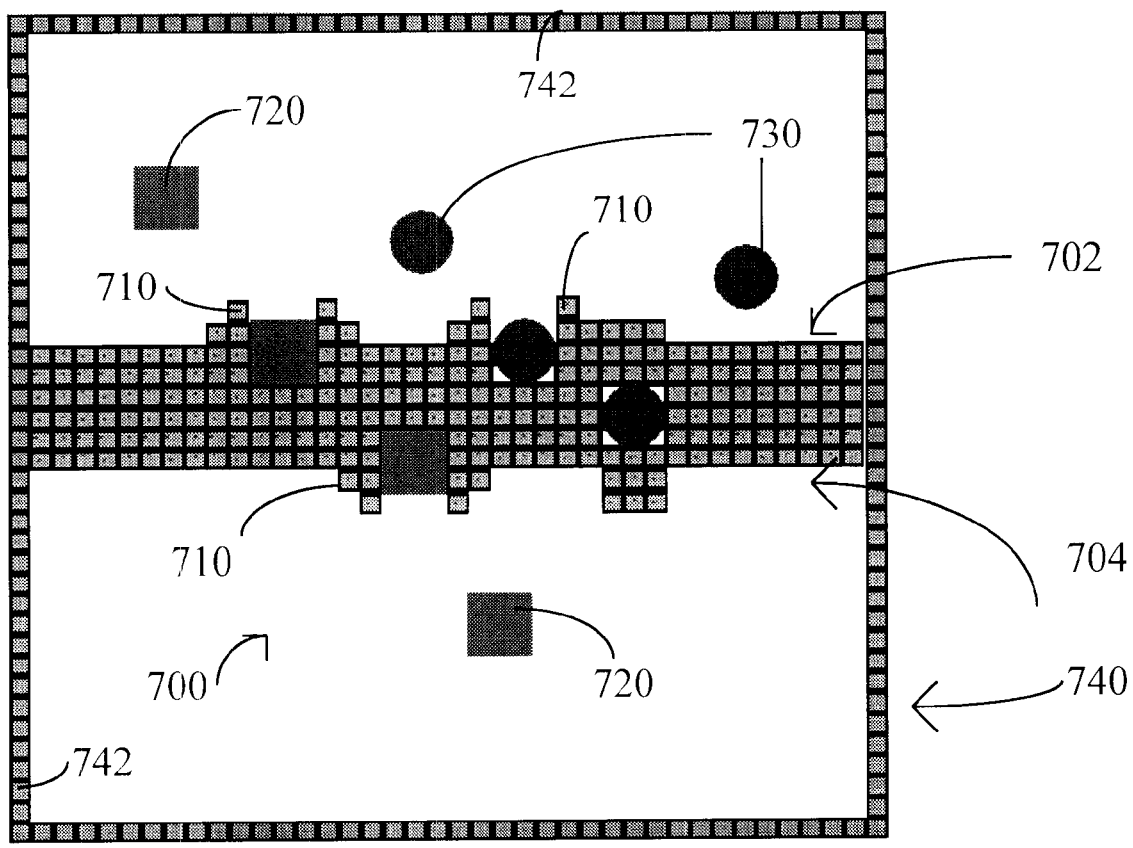
FIG. 7 is a schematic of an exemplary embodiment of a modular robotic smart membrane according to the invention.

FIG. 7 displays a schematic illustration of an exemplary embodiment of a smart membrane 700, which is a modular robot. The membrane 700 includes a plurality of robot modules 710. In this exemplary embodiment, the smart membrane 700 sorts foreign objects 720 and 730 by shape. The objects 720 are square and the objects 730 are circular.

The membrane 700 is disposed in a world 740 that includes a plurality of walls 742. The overall objective or function of the membrane 700 is to allow the square objects 720 to pass through the membrane 700 and to prevent the circular objects 730 from passing through the membrane 700. Both the square and the circular foreign objects 720 and 730 come into contact with the membrane 700 from above the membrane, on a first side 702 of the membrane 700. The membrane 700 configures itself so as to allow square objects 720 to pass through to the bottom of the world 740, and so as to prevent round objects 730 from passing through a second side 704 of the membrane 700.

The filtering capabilities of the smart membrane 700 emerge from the simple motions of its constituent robot modules 710. In various exemplary embodiments the modules 710 are controlled by a central processing unit, not shown, that determines the move that each module 710 needs to make in order to achieve the desired global behavior of the membrane 700. This information is then propagated to the relevant modules. The central processing unit may be any known or later developed processing device.

In other various exemplary embodiments, the control of the membrane 700 is based on a distributed control paradigm. With distributed control, each module 710 has its own processor and uses the information provided by its sensors and interactions with other modules to determine the next move it will make.

In various exemplary embodiments, each module 710 is running the same control program, and the correct global filtering behavior of the membrane emerges from the behavior of the individual modules 710 determined by this program, their sensor readings, and communication with other modules 710.

All the modules 710 run their control programs, but behave differently depending on individual sensor values, internal state, and messages received from nearby modules.

The control program can be generated from genetic programming methods, including but not limited to the methods disclosed in the incorporated U.S. patent application Ser. No. 09/611,395, filed Jul. 7, 2000. In other various exemplary embodiments, the control program can be provided by any known or later developed learning programming technique. The control program can also be any predefined program.

Genetic programming is an evolutionary computing technique that is able to generate a computer program that solves a problem when given a high level description of the problem to be solved. A description of genetic programming is found in John R. Koza, "Genetic Programming: On the Programming of Computers by Means of a Natural Selection", Cambridge, MA: MIT Press 1992, which is herein incorporated by reference in its entirety.

The following is a description of one exemplary embodiment of a method according to the invention, wherein the control program is generated by genetic programming. In order to use genetic programming to create a computer program, it is necessary to provide the algorithm with an objective function for the problem to be solved, a set of primitive functions with which to build the programs, a few parameters, and for each primitive function, the return type, the number of arguments and the type of arguments.

The genetic programming method begins by generating a population of grammatically legal random programs in the target language. The fitness of each program in the population is determined by executing each program and measuring how that program scores on the objective function.

Then the existing population of computer programs is used to create a new population of computer programs using genetic operators. The genetic operators are applied in proportion to the fitness of the computer programs so that more fit programs are used more often to create new computer programs. That is, more fit programs are selected more often to be "parents" for the creation of new computer programs in the next generation.

The genetic operations used are a crossover operation, a mutation operation and a cloning operation.

The crossover operation takes parse tree representations of two fitness selected "parent" computer programs and creates two new "child" programs by exchanging a randomly selected subtree between the two parents.

The mutation operation takes a parse tree representation of one fitness selected computer program, randomly selects one of its subtrees, and replaces that subtree with a new randomly created subtree.

The cloning operation takes one fitness selected computer program and creates a copy of it for inclusion in a new population of programs.

After an entirely new population has been created by applying the genetic operations to the previous population, the fitness of each program in the new population is measured using the fitness/objective function as before.

The process of creating new populations of programs and measuring their fitness is repeated until a computer program is discovered that gets an optimal score on the fitness function or the process is terminated. The computer program with the best score on the fitness function is the result of this process.

In an exemplary embodiment, computing the fitness function involves running the evolved computer program on each module unit to control a simulation of the modular robotic smart membrane in a simulated world. The computed value of the objective function is a measure of how well the modular robot performed on the goal task. For example, the fitness function might measure how many foreign objects are correctly sorted across the membrane. It should be appreciated that there may be many features of each program that the fitness function measures. The programs are compared to determine which program has the best solution for the goal based on the evaluated features. Further, it should be appreciated that any known or later developed method of multi-objective optimization may be used to determine the best program for the desired goal.

A fitness function (or objective function) must be provided to the genetic programming system for the specific task or goal that is being solved. In various exemplary embodiments, the function is usually defined so that the better an individual performs, the lower its fitness value. An example of a fitness function is the number of bad objects that are mistakenly accepted plus the number of good objects that are mistakenly rejected by the membrane. The fitness function can also include penalties for things like the time taken to solve the problem, the amount of power used to solve the problem, etc.

Each decentralized controller in each of the modules is evaluated by running a simulation of the modular robot in a world, where each module is controlled by its own copy of the decentralized controller under evaluation. The simulation tracks the state of the world, including all walls and objects, and the location of each robot module in the world.

In one example embodiment, on each turn of the simulation, each of the robot modules is executed one at a time. In another embodiment, all of the robot modules are executed concurrently. The simulation is run for either a pre-specified maximum number of turns, or for a pre-specified maximum amount of computer time, or until some other predefined stopping condition becomes true.

The primitive functions from which the evolved computer programs are constructed are provided to the genetic programming system. In various exemplary embodiments, a designer provides the primitive functions. In other various exemplary embodiments, another computer program provides the primitive functions. It should be appreciated that there are other numerous ways that the primitive functions could be provided, including, but not limited to a program that queries the modules to determine the functions of the module and generates the primitive functions on the results of the query.

In various exemplary embodiments, implementations for each primitive function are supplied to the genetic programming system. In various exemplary embodiments, the return type and parameter types of each primitive function are also given. Examples of primitive functions are arithmetic functions, Boolean functions, looping constructs, conditional functions, etc. Primitive functions for accessing the robot module's sensors, internal states, and motors are also used in various exemplary embodiments.

In various exemplary embodiments, the language for the evolved computer programs is defined. In various exemplary embodiments, the language is defined by supplying an explicit BNF grammar for the language. The language can also be defined by specifying the return type and parameter types for each of the primitive functions in the language. In this case, the type specifications for the entire set of primitive functions together create an implicit grammar definition for the language.

In various exemplary embodiments, the parameters that are supplied to the genetic programming system include:
  a. the size of the population (i.e. the number of programs that are being considered);
  b. the percentage of crossover, mutation, and cloning operations to perform;
  c. the maximum depth of the computer programs to create (i.e. after the initial population size, this constraint controls the size of the number of created programs);
  d. the maximum depth of the computer programs to generate randomly in the beginning of the run;
  e. the maximum depth of the sub programs to generate for mutations; and
  f. the maximum amount of computer time or simulation steps to use during the fitness evaluation.

It should be appreciated the parameters a through f, set forth above do not have to be set to particular values. Further, it should be understood, that an algorithm may be used to determine these parameters automatically without any human intervention.

The method outputs a program that will be run in each of the modules and will enable the entire programmable smart membrane to achieve the desired sorting behavior.

The following description is an exemplary embodiment of a modular robotic smart membrane according to the invention. However, it should be appreciated that modular robotic smart membranes according to this invention may include numerous other embodiments.

Figure 8:
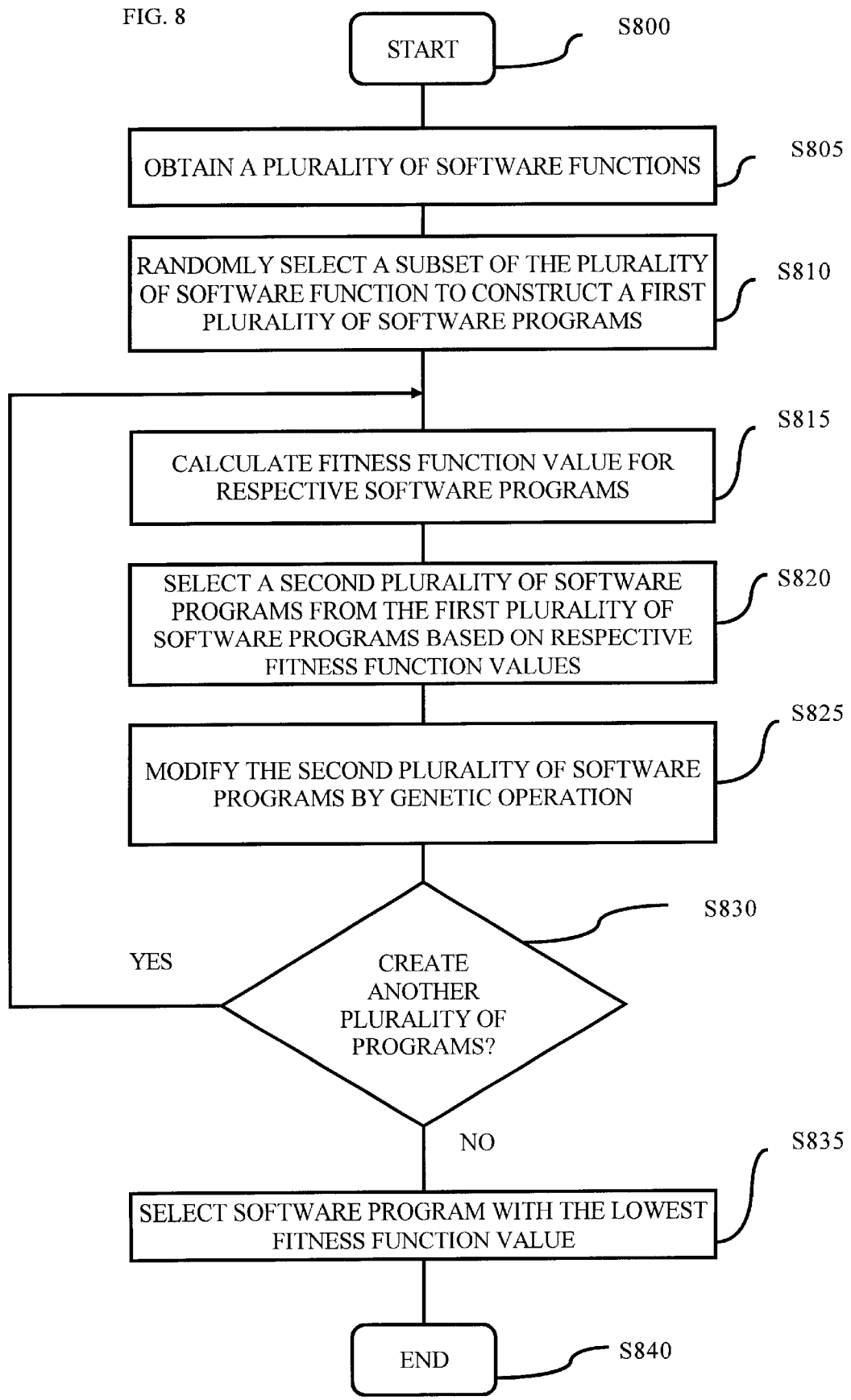
FIG. 8 is a flowchart of one exemplary embodiment for constructing a software program for a module unit of a smart membrane, according to the invention.

FIG. 8 displays a flowchart for an exemplary embodiment of a method for generating a control program according to the invention. It should be appreciated that FIG. 8 illustrates specific functions of an embodiment of the present invention, but that in alternate embodiments, more or fewer functions may be used. In an embodiment of the present invention, steps/functions set forth in FIG. 8 may represent software programs, software objects, software functions, software subroutines, code fragments, hardware operations, user operations, singly or in combination.

The method begins at step S800 and proceeds to step S805, wherein a plurality of software functions are obtained as described herein. At step S810, a set of the plurality of software functions are randomly selected to provide a first plurality of software programs for solving a problem as described herein.

At step S815, a fitness function is used to evaluate the first plurality of software programs by calculating respective fitness function values as described herein. In various exemplary embodiments, a fitness function is provided by a user.

At step S820, a second plurality of software programs is selected from the first plurality of software programs based on the first plurality of software programs respective fitness function values, as described herein. In various exemplary embodiments, the second plurality of software programs includes duplicate software programs of the first plurality of software programs.

At step S825, the second plurality of software programs are modified by genetic operations, such as crossover, mutation and cloning, singly or in combination, as described herein.

At step S830, a decision is made whether another plurality of programs are to be constructed, or a new generation or population is to be formed.

If a new generation of software programs is desired, the method proceeds back to step S815, where steps S815 through S825 are repeated. Otherwise, the method proceeds to step S835, wherein the software program for a module which has the lowest fitness function is selected as the control program, as described herein.

Figure 9:
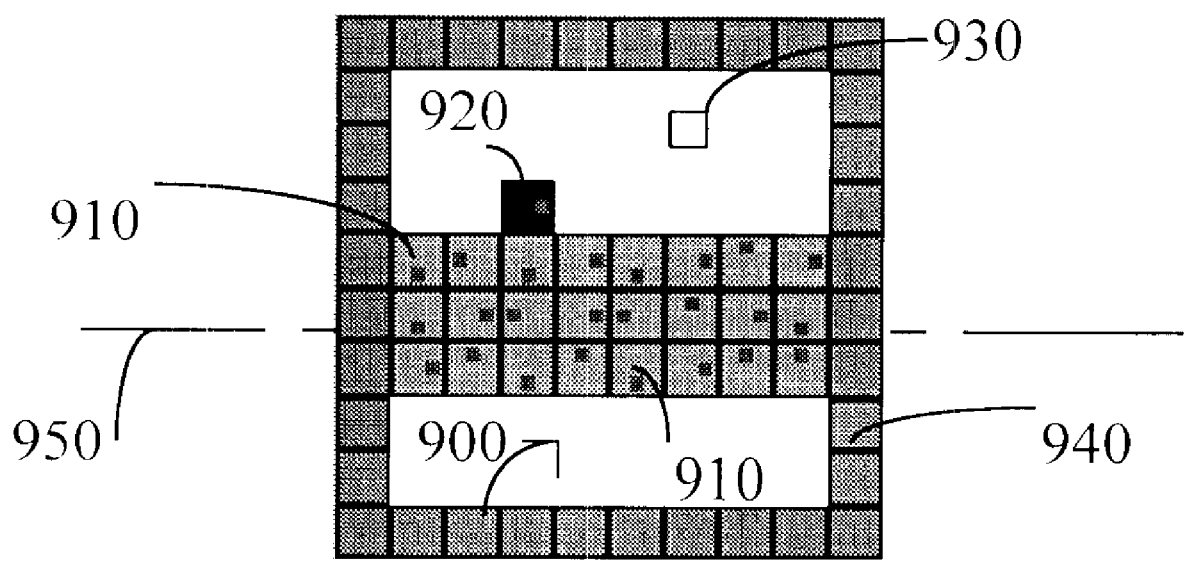
FIG. 9 is a schematic of another exemplary embodiment of a modular robotic smart membrane according to the invention.

FIG. 9 displays a schematic of an exemplary embodiment of a modular robotic smart membrane 900 that includes a plurality of robot modules 910. The membrane 900 filters objects based on color. Objects 920 have a first color and objects 930 have a second color. The second color can be any color other than the first color. The second color for all of the objects 930 does not have to be the same color.

It should be understood that any set of properties that can be computed by the membrane using its sensor, processing, and memory capabilities can be used as the basis of filtering.

In this exemplary embodiment, the objects 920, 930 are the size of a single robot module 910. However, it should be appreciated that the objects 920, 930 may be larger or smaller than a single robot module 910.

Initially, the objects 920, 930 are placed on top of the smart membrane 900. The membrane 900 will reconfigure itself so that the objects 930 with the second color remain above the membrane 900 and the objects 920 with the first color are moved to the bottom of the world 940. In various exemplary embodiments, the membrane 900 is required to end up, after filtering, close to its initial position, though the individual modules 910 within the membrane do not need to end up close to their original positions.

In this exemplary embodiment, the simulated world 940 used for evolving the control software for the modular robotic smart membrane 900 is square with 10 units on a side. In this exemplary embodiment, the wall units are the same size as the module units 910. However, it should be understood that in other various exemplary embodiments, the size of the wall units may vary. In this exemplary embodiment, the world 940 is divided up into $10^2=100$ grid locations. The perimeter grid locations of the entire world contain wall boundary objects that the robot modules cannot pass through.

In this exemplary embodiment, each robot module 910 is in the shape of a square that occupies one grid location in the world 940. The state of a robot module includes its location in the world, the values of the most recent messages received from adjacent robot modules in each of eight directions, the values of its registers, the current values of the sensors, and the facing direction of the module.

In this exemplary embodiment, directions are encoded as real values in [0.0, 1.0), where direction 0.0 is a positive x axis of a robot module 910 and direction values increase going around counter clockwise. The direction values used by each robot module 910 are local to a frame of reference 912 of each module 910. The direction that a robot module 910 is facing is always direction 0.0 where direction 0.25 is 90 degrees to the left of where it is facing, etc. In other various exemplary embodiments, the direction values are not discrete, but rather continuous.

There are three types of sensors, one for detecting walls, one for detecting other robot modules, and one for detecting foreign objects. Each module has eight sensors of each type, pointing in different directions. The eight directions for the sensors are: 0.0=east, 0.125=northeast, 0.25=north, 0.375=northwest, 0.5=west, 0.625=southwest, 0.75=south, and 0.875=southeast. The values of the sensors are given in units of intensity in [0.0, 1.0], where the intensity is the inverse of the distance to the thing sensed, 0.0 means that the thing was not sensed at all, and 1.0 means that the thing was sensed in the immediately adjacent grid location.

The robot modules 910 are able to move relative to one another. In this exemplary embodiment, the modules 910 move in four directions: east, north, west, and south. In this embodiment, an individual robot module 910 moves by sliding against an adjacent robot module 910. In this exemplary embodiment, a robot module 910 moves by pushing itself along another robot module 910 that is adjacent to it at 90 degrees from a direction of motion. Similarly, a robot module 910 can pull against another robot module that is diagonally adjacent to it in the direction of motion. Modules with this type of movement have been implemented at Johns Hopkins University. See Amit Pamecha, Imme Ebert-Uphoff, Gregory S. Chirikjian, "A Useful Metrics for Modular Robot Motion Planning," IEEE Transactions on Robots and Automation, pp 531–545, Vol. 13, No. 4, August 1997, which is incorporated herein by reference in its entirety. For this exemplary embodiment, sensing, communication, and processing capabilities are added to the modules disclosed by Pamecha.

In this exemplary embodiment, the robot modules 910 initiate different types of moves to reconfigure the membrane 900. In this exemplary embodiment, the movement types of the modules 910 include a single move and a line move.

FIGS. 10A–10C display, in three separate steps, a single move over time for two modules 910a and 910b, respectively. The single move is the movement of a single module. The single move is successful if the moving robot module 910 is moving into an empty grid location identified as "x" and "y".

FIGS. 11A–11B display, in two steps, a line move over time of a line of robot modules 910c. The line move is the movement of the entire line of robot modules 910c. The line movement is successful if the front-most module 910d in the line is moving into an empty grid location, identified as "w". A line move can be initiated by any robot module 910 in a line of robot modules.

In this exemplary embodiment, the objects 920 and 930 are inactive modules that are the same size as the robot modules 910. However, it should be understood that the objects do not have to be the same size and may also vary in size. The robot modules 910 can push and pull these inactive modules just as they can with other robot modules.

The following discussion is for an exemplary embodiment for evolving a control program for the forgoing exemplary membrane. In this exemplary embodiment, the fitness for each individual program is calculated as a weighted average of fitness over 24 simulated worlds. It should be appreciated that in other various exemplary embodiments, the fitness of an individual program may be based on a single simulated world.

In this exemplary embodiment, each simulation world is initialized with the modules of the smart membrane arranged in a vertically centered rectangle extending 8 units from the left wall 946 to the right wall 948. In twelve of the 24 simulated worlds for this embodiment, the membrane 900 includes a height of three modules 910; in the other twelve, the membrane 900 includes a height of four modules 910. Each module 910 has a facing direction. In this exemplary embodiment, the facing direction of each of the modules 910, and the order in which the programs of the modules 910 are executed, is determined randomly for each world. It should be appreciated that these factors may be predefined or preset.

Each simulated world used to measure fitness also includes an object, either an object 920 with the first color or an object 930 with the second color, to be filtered, which is placed on top of the membrane 900. The goal of the membrane 900 is to filter the objects so that objects 930 with the second color remain above the membrane 900, while the objects 920 with the first color are transported through the membrane 900 to end up below the membrane 900.

In this exemplary embodiment, a representative sample of possible horizontal positions for the objects is contained in the 24 fitness worlds. In six of the worlds, the object that appears initially above the membrane is an object 930 with the second color, in which case the object 930 does not need to be moved at all. In the other 18 worlds, the object that appears initially above the membrane is an object 920 with the first color, and the membrane 900 should transport the object 920 through the membrane 900 to the other side.

In order to evaluate the fitness of an individual program for a particular world, the program is installed on each module in the simulation world. Then the robot modules 910 execute the program one at a time, in turn. In this exemplary embodiment, the order of execution of the program by the individual modules 910 is selected randomly for that particular world. The sequence of all robot module program executions is a simulation "turn." In this exemplary embodiment, the fitness of a particular program is determined by averaging the value given by the fitness after each of ten simulation turns. In this embodiment, lower fitness values are better, and make it more likely that this individual program will have offspring in the next generation of evolution.

For this exemplary embodiment, the fitness value is a weighted sum of two measurements. The first measurement is the location of the object 920 or 930 relative to the membrane 900. The second measurement is the current absolute position of the membrane 900. It should be appreciated, that in other various exemplary embodiments, the fitness value may be based on more or less measurements.

The first measurement is determined by the average offset in the vertical dimension of the modules 910 from the object 920 or 930, as a fraction of the least desirable displacement. For example, when the object is an object 920 with the first color, this term can be minimized by reconfiguring so that the object 920 ends up below all of the membrane modules 910. This term has the effect of making sure that each object ends up in the appropriate final position.

The second measurement is determined by the average absolute displacement of each module 910 from the horizontal central axis 950 of the starting position of the membrane 900. This measurement penalizes the program for failing to keep the original structure and position of the membrane 900 intact, while the object 920 or 930 is being filtered.

In an exemplary embodiment, each decentralized controller program generated during the evolutionary process is a legal instance of the language defined by the BNF grammar given below. In this exemplary grammar, the start symbol is <program>.

Language Grammar:

```
<program> := <realExpression>
<realExpression> :=
      "(" <realFunction> ")"
       | <realConstant>
<realFunction> :=
      sendMessage <realExpression> <realExpression>
    | readMessage <realExpression>
    | rotate <realExpression>
    | setRegister <realExpression> <realExpression>
    | getRegister <realExpression> <realExpression>
    | readSensorSelf <realExpression>
    | readSensorWall <realExpression>
    | readSensorExternalObject <realExpression>
    | getTurn
    | protectedDivide <realExpression> <realExpression>
    | protectedModulus <realExpression> <realExpression>
    | if <booleanExpression> <realExpression>
  <realExpression>
    | progN <realExpression> <realExpression>
<realConstant> := 0.0 | 0.25 | 0.5 | 0.75 | 1.0 | –1.0
<booleanExpression> := "(" <booleanFunction> ")"
<booleanFunction> :=
      moveLine <realExpression>
    | moveSingle <realExpression>
    | and <booleanExpression> <booleanExpression>
    | less <realExpression> <realExpression>
    | isFirst color <realExpression>
    | isSecond color <realExpression>
```

The following is a description of the foregoing exemplary functions.

A. (SendMessage Message Direction)

This function sends the real valued message message from the sending module to an adjacent module (if any) in the direction direction, relative to the frame of reference of the sending module. The direction is interpreted mod 1, and then rounded to the nearest eighth to indicate one of the eight adjacent grid locations. This function returns the value of the message sent.

B. (ReadMessage Direction)

This function reads the real valued message from the adjacent module (if any) that is location at the relative direction direction from the sending module. The direction is interpreted mod 1, and then rounded to the nearest eighth to indicate one of the eight adjacent grid locations. This function returns the value of the message read.

C. (Rotate Direction)

This function rotates the robot module by the amount direction. This does not physically move the module, it just resets the internal state of the robot module's internal facing direction. This function returns the value of direction.

D. (SetRegister Index Value)

This function sets the value of the robot module's register numbered index to value. This function returns value.

E. (GetRegister Index)

This function gets the current value of the robot module's register numbered index. This function returns the value of the register.

F. (ReadSensorSelf Direction)

This function reads the intensity value of the self sensor. Intensity is the inverse of the distance to the closest robot module at the relative direction direction. The intensity is zero if there is no robot module in that direction. This function returns the intensity value.

G. (ReadSensorWall Direction)

This function reads the intensity value of the wall sensor. Intensity is the inverse of the distance to the wall or obstacle in the relative direction direction. The intensity is zero if there is no wall or obstacle in that direction. This function returns the intensity value.

H. (ReadSensorExternalObject Direction)

This function reads the intensity value of the external object sensor. Intensity is the inverse of the distance to external object in the relative direction direction. The intensity is zero if there is no external object in that direction. This function returns the intensity value.

I. (GetTurn)

This function returns the current value of the "turn" variable for the simulation. The "turn" variable is set to zero at the beginning of the simulation and is incremented each time all of the robot modules are executed.

J. (ProtectedDivide Operand1 Operand2)

This function evaluates both operands, and returns operand1 divided by operand2. If operand2 is zero, then this function returns 1.

K. (ProtectedModulus Operand1 Operand2)

This function evaluates both operands, and returns the real valued remainder of operandI divided by operand2. If operand2 is zero, then this function returns 1.

L. (If Condition Expression1 Expression2)

This function evaluates the Boolean condition. If condition is true, then expression1 is evaluated and its value is returned. If condition is false, then expression2 is evaluated and its value is returned.

M. (Progn Expression1 Expression2)

This function evaluates expression1 and expression2, returning the result of expression2.

N. (MoveLine Direction)

This function causes an entire line of robot modules to move in the relative direction direction if they can move. The line of robot modules to move is the line of modules collinear with the current robot module in the relative direction direction of the current robot module. The line of modules can move if and only if the front-most robot module in the line is not blocked by an immovable wall or obstacle and if there is another robot module adjacent to the line that it can push or pull against. This function returns true if the line of modules is able to move, and returns false otherwise.

O. (Movesingle Direction)

This function causes the current robot module to move in the relative direction direction if it can move. The module can move if and only if it is not blocked by any other object, and if there is another robot module adjacent to it that it can push/pull against. This function returns true if the line of modules is able to move, and returns false otherwise.

P. (And Operand1 Operand2)

This function evaluates both operands and returns true if and only if both of the operands are true, and returns false otherwise.

Q. (Less Operand1 Operand2)

This function evaluates both operands and returns true if operand1 is less than operand2, and returns false otherwise.

R. (IsFirst Color Direction)

This function returns true if there is a first color object immediately next to this module in direction direction, and returns false otherwise.

S. (IsSecond Color Direction)

This function returns true if there is a second color object immediately next to this module in direction direction, and returns false otherwise.

EXPERIMENTAL RESULTS

The exemplary embodiment of the membrane displayed in FIG. 9 was evaluated with the following parameters:

the size of the population=72,000 individuals;

the percentage of crossover operations to perform=99.0%;

the percentage of mutation operations to perform=1.0%;

the percentage of cloning operations to perform=0.0%;

the maximum depth of the computer programs to create= 9;

the maximum depth of computer programs generated randomly in the beginning of the run=5;

the maximum depth of the sub programs to generate for mutations=4;

the maximum amount of computer time to use during the fitness evaluation=unbounded; and the number of turns to simulate=10.

Figure 12A:
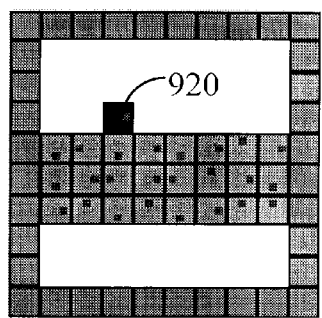
FIGS. 12A–12C are schematics displaying the smart membrane of FIG. 9 in an initial stage, an intermediary stage and a subsequent stage of filtering an object.
Figure 12B:
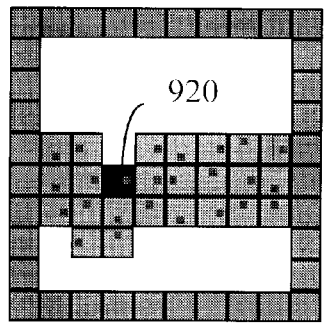
Figure 12C:
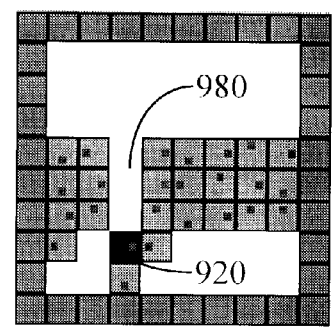

A working solution for the control program for this embodiment emerged in generation 32 of the evaluation/run. The solution was composed of 49 primitive function references and 32 real valued constants. The behavior of this solution is shown in FIGS. 12A–12C for a single initial world condition at three points in time, namely at an initial stage, an intermediate stage and a subsequent stage, respectively, during the simulation. As shown in FIG. 12C, a temporary transport channel 980 is formed by the movements of the modular units. A string representation of the control program is given here:

(ProtectedMod (SendMessage (If (IsBlue (ProtectedDiv 0.5 1.0))
(If (Move −1.0) (ProtectedDiv 0.5 (Rotate
(GetRegisterEntry (SetRegisterEntry 0.5 0.25)))) 0.75)
(Rotate (ProtectedDiv (Rotate (ProtectedDiv (Rotate 0.25)
(ReadSensorSelf 0.5))) (ProtectedMod 0.25
(SetRegisterEntry 0.75 0.0))))) (If (MoveOne (ProtectedDiv
(If (IsRed 0.25) (ReadSensorSelf 0.0) (GetRegisterEntry
0.5)) getTurn)) 0.0 0.75)) (SendMessage (If (IsBlue
(ProtectedDiv 0.5 1.0)) (If (Move −1.0) (ProtectedDiv 0.25
(Rotate (ReadSensorBrokenAlien −1.0))) (ReadSensorWall
0.75)) (Rotate (ProtectedDiv (Rotate (ProtectedDiv (Rotate
0.25) (ReadSensorSelf 0.5))) (ProtectedMod 0.25
(SetRegisterEntry 0.75 0.0))))) (If (MoveOne 0.0) 0.0
(ProgN 0.0 (GetRegisterEntry 0.0)))))

Figure 13:
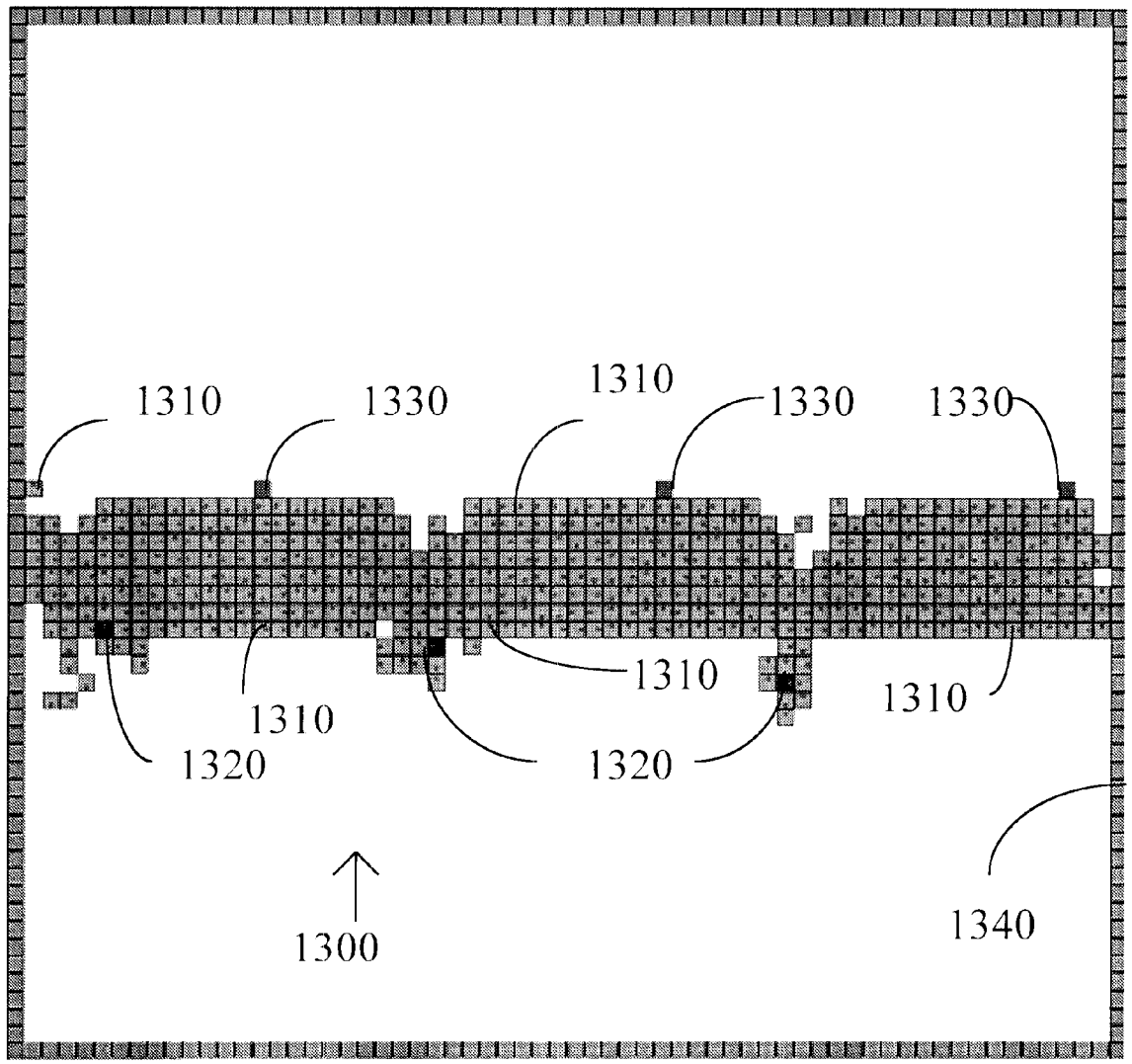
FIG. 13 is a schematic of another exemplary embodiment of modular robotic smart membrane according to the invention.

Although this program was evolved for an exemplary embodiment including a 10×10 world, with membrane heights of 3 and 4, and one object filtered at a time, it should be appreciated that the software scales so that it works for membranes of other exemplary embodiments consisting of hundreds of modules arranged in rectangles of greatly varying heights and widths. The software also successfully filters multiple objects at once. For example, as shown in FIG. 13, the program functioned successfully when installed on each of 496 robot modules 1210 of a membrane 1200, in a 64×64 world 1240, with a membrane height of eight modules and six objects to be filtered (three second color objects 1230 and three first color objects 1220 spaced evenly along the top of the membrane. FIG. 13, displays a schematic representation of this exemplary embodiment after the filtering was completed.

It should be appreciated that in various exemplary embodiments, a smart membrane can be programmed to be actively moving while performing its desired function or while waiting for objects to come into contact with it. For example, the module units of a smart membrane may be programmed to cause the top surface of the membrane to be agitated so that it rises and falls in an effort to come into contact with objects to be filtered, sorted or absorbed. In various exemplary embodiments, the agitated movement is a sinusoidal wave motion.

It should also be appreciated that there are other exemplary embodiments of smart membranes and types of module units other than robotic modules according to the invention. Further, the invention may be used in a variety of applications from a macro scale, such as but not limited to a parts sorter, to a nanometer scale, such as but not limited to chemical application of purifying substances and biochemical and biomedical applications.

It should also be appreciated that a smart membrane of the invention is applicable to other uses such as assembling and disassembling objects.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A membrane for conducting an overall function of at least one of a sorting function, a filtering function and an absorbing function of at least one object having an attribute, comprising:
   a plurality of module units disposed adjacent each other;
   each module unit of the plurality of module units obtains information of an environment around the module unit that is based on information received by at least a portion of the plurality of module units;
   at least the portion of the plurality of module units each perform at least one function based on at least a first control method; and
   the first control method determines the function based on the information for each of the plurality of module units,
   wherein the at least a portion of the plurality of module units perform the at least one function to collectively perform the overall function of the membrane based on the attribute of the object.

2. The membrane, as recited in claim 1, wherein:
   the plurality of module units are disposed adjacent each other to form at least two layers of module units.

3. The membrane, as recited in claim 1, wherein:
   the plurality of module units are disposed to form a membrane that provides the overall function in two dimensions.

4. The membrane, as recited in claim 1, wherein:
   the plurality of module units are all identical.

5. The membrane, as recited in claim 1, wherein:
   the plurality of module units are robotic modules.

6. The membrane, as recited in claim 5, wherein the robotic modules are side-sliding robotic modules.

7. The membrane, as recited in claim 1, wherein:
   each of the plurality of module units includes at least one sensor that obtains the information.

8. The membrane, as recited in claim 1, wherein:
   each of the plurality of module units includes at least one object sensor that detects the objects, at least one other module unit sensor that detects other module units of the plurality of module units that are adjacent the module unit and at least one wall sensor that detects walls of a world that the membrane is disposed in all as the information.

9. The membrane, as recited in claim 1, wherein:
   each of the plurality of module units includes a processor that executes the first control method.

10. The membrane, as recited in claim 1, wherein:
    each of at least a portion of the plurality of module units performs the function based on a second control method that determines the function based on the information.

11. The membrane, as recited in claim 1, wherein:
    the first control method is a program.

12. The membrane, as recited in claim 11, wherein:
    the program is generated by genetic programming.

13. The membrane, as recited in claim 11, wherein:
    the program is predefined.

14. The membrane, as recited in claim 1, wherein:
    the movement of one of the plurality of module units is allowed only when the one of the plurality of module units is adjacent another module unit.

15. The membrane, as recited in claim 1, wherein: the movement is a single movement of one of the plurality of module units.

16. The membrane, as recited in claim 1, wherein:
    the movement is a line movement of a line of the plurality of module units.

17. The membrane, as recited in claim 1, wherein:
    each of the plurality of module units includes a motor for performing the movement.

18. The membrane, as recited in claim 1, wherein:
    the movement is a sliding movement of one of the plurality of module units, relative to other adjacent module units.

19. The membrane, as recited in claim 1, wherein:
    the plurality of module units collectively perform the overall function of the membrane based on more than one attribute of the object.

20. The membrane, as recited in claim 1, wherein:
    the plurality of module units collectively perform the overall function of the membrane for more than one object.

21. The membrane, as recited in claim 1, wherein:
    each of the plurality of module units obtains the information by at least one communication link with another module unit or the environment.

22. The membrane, as recited in claim 21, wherein:
    at least one communication link is a physical contact with at least one other module unit of the plurality of module units.

23. The membrane, as recited in claim 21, wherein:
    the at least one communication link is an electrical connection with at least one other module unit of the plurality of module units.

24. The membrane, as recited in claim 21, wherein:

the at least one communication link is a wireless communication link with at least one other module unit of the plurality of module units.

25. The membrane, as recited in claim 1, wherein:

the first control method is reprogrammable.

26. The membrane, as recited in claim 1, wherein:

the information is information that is local to each of the plurality of module units.

27. The membrane, as recited in claim 1, wherein:

the function is a movement.

28. The membrane, as recited in claim 1, wherein:

the function is a change in an internal state of one module unit of the plurality of module units.

29. The membrane, as recited in claim 1, wherein:

the information is the first attribute.

30. A self-reconfigurable robot, comprising:

a first module;

a second module disposed adjacent the first module;

the first and second modules each comprising a function circuit and a sensor; and at least one controller, wherein the at least one controller executes a first control program to generate a function instruction for the first and second modules based on information obtained by the sensor, and wherein the function circuits perform a function based on the function instructions and the function of the first and second modules collectively perform an overall function of at least one of a filtering function, a sorting function and an absorbing function for the reconfigurable robot.

31. A self-reconfigurable robot, as recited in claim 30, wherein:

the function circuit operates a movement motor.

32. A self-reconfigurable robot, as recited in claim 30, wherein: the information is local information for each of the first and second modules.

33. A self-reconfigurable robot, as recited in claim 30, wherein:

the information is information from both the first and second modules.

34. An article of manufacture, including a computer-readable memory, comprising:

a first plurality of software functions for performing a respective plurality of functions for a smart membrane;

a first software program for randomly selecting a plurality of software functions for forming a first plurality of software programs;

a fitness function for obtaining a respective plurality of fitness function values for the respective first plurality of software programs; and, a second software program for conducting a second plurality of software programs from the first plurality of software programs based on the plurality of respective fitness function values.

35. A method for providing software for a smart membrane, comprising:

providing a plurality of software functions for performing a respective plurality of module functions;

constructing a first plurality of software programs for solving an objective from the plurality of software functions;

executing the first plurality of software programs to obtain a plurality of respective results;

providing an objective fitness function for providing a fitness value;

calculating a plurality of respective fitness function values for the first plurality of software programs;

selecting a second plurality of software programs from the first plurality of software programs based on the respective fitness function values; and, constructing a third plurality of software programs from the second plurality of programs using a genetic operation.

36. A membrane for conducting an overall function of at least one of a sorting function, a filtering function and an absorbing function of at least one object having an attribute, comprising:

a plurality of module units disposed adjacent each other;

each module unit of the plurality of module units obtains information of an environment around the module unit and includes at least one object sensor that detects the objects, at least one other module unit sensor that detects other module units of the plurality of module units that are adjacent the module unit and at least one wall sensor that detects walls of a world that the membrane is disposed in all as the information;

at least a portion of the plurality of module units each perform at least one function based on at least a first control method; and the first control method determines the function based on the information for each of the plurality of module units, wherein the at least a portion of the plurality of module units perform the at least one function to collectively perform the overall function of the membrane based on the attribute of the object.

* * * * *